United States Patent
Shi et al.

(10) Patent No.: US 12,466,723 B2
(45) Date of Patent: Nov. 11, 2025

(54) MEMS SWITCH, PREPARATION METHOD THEREOF, AND ELECTRONIC APPARATUS

(71) Applicants: Beijing BOE Technology Development Co., Ltd., Beijing (CN); BOE Technology Group Co., Ltd., Beijing (CN)

(72) Inventors: Yingli Shi, Beijing (CN); Chao Zhou, Beijing (CN); Yanzhao Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/028,567

(22) PCT Filed: Apr. 27, 2022

(86) PCT No.: PCT/CN2022/089617
§ 371 (c)(1),
(2) Date: Mar. 27, 2023

(87) PCT Pub. No.: WO2023/206154
PCT Pub. Date: Nov. 2, 2023

(65) Prior Publication Data
US 2024/0359973 A1    Oct. 31, 2024

(51) Int. Cl.
*B81B 7/02* (2006.01)
*B81C 1/00* (2006.01)
(Continued)

(52) U.S. Cl.
CPC ............ *B81B 7/02* (2013.01); *B81C 1/00142* (2013.01); *H01H 59/0009* (2013.01);
(Continued)

(58) Field of Classification Search
CPC ........................ B81C 1/00142; B81C 1/0015; H01H 1/0036; H01P 1/122; H01P 1/127
(Continued)

(56) References Cited

U.S. PATENT DOCUMENTS 10,941,036 B2 *  3/2021  Luce .................... H01H 1/0036
2004/0173872 A1  9/2004  Park et al.
(Continued)

FOREIGN PATENT DOCUMENTS

| CN | 1601685 A | 3/2005 |
|---|---|---|
| CN | 101147223 A | 3/2008 |

(Continued)

OTHER PUBLICATIONS

E. Jouin et al., A Novel Multi-Electrode RF-MEMS Switch for Bipolar Actuation Bias Leakage Reduction, IEEE/MTT-S International Microwave Symposium, pp. 262-265, 2021.
(Continued)

*Primary Examiner* — Hai L Nguyen
(74) *Attorney, Agent, or Firm* — Ling Wu; Stephen Yang; Ling and Yang Intellectual Property

(57) ABSTRACT

A MEMS switch, a preparation method thereof, and an electronic apparatus. The MEMS switch includes: a substrate, a coplanar waveguide line structure disposed on a side of the substrate, an isolation structure disposed on a side of the coplanar waveguide line structure away from the substrate, a film bridge disposed on a side of the isolation structure away from the substrate. The coplanar waveguide line structure includes a first wire, a first DC bias line, a second wire, a second DC bias line and a third wire arranged at intervals sequentially. The second wire is one of an RF signal transmission line and a ground line, the first wire and the third wire are the other of the RF signal transmission line and the ground line. The film bridge is crossed between the
(Continued)

first wire and third wire, and is connected with the first wire and the third wire respectively.

18 Claims, 9 Drawing Sheets

(51) Int. Cl.
  *H01H 59/00* (2006.01)
  *H01P 1/12* (2006.01)

(52) U.S. Cl.
  CPC .......... *H01P 1/122* (2013.01); *B81B 2201/01* (2013.01); *B81B 2203/0109* (2013.01); *B81B 2203/0323* (2013.01); *B81B 2203/0353* (2013.01); *B81C 2201/0105* (2013.01)

(58) Field of Classification Search
  USPC .......................................................... 333/262
  See application file for complete search history.

(56) References Cited

U.S. PATENT DOCUMENTS

| | | |
|---|---|---|
| 2008/0237024 A1 | 10/2008 | Millet |
| 2008/0272857 A1 | 11/2008 | Singh |
| 2014/0009244 A1 | 1/2014 | Pavageau |

FOREIGN PATENT DOCUMENTS

| | | |
|---|---|---|
| CN | 101620952 A | 1/2010 |
| CN | 103746157 A | 4/2014 |
| CN | 103972612 A | 8/2014 |
| CN | 203910941 U | 10/2014 |
| CN | 104150434 A | 11/2014 |
| CN | 105788971 A | 7/2016 |
| CN | 106672894 A | 5/2017 |
| CN | 111627759 A | 9/2020 |
| EP | 3459101 B1 | 12/2021 |
| KR | 20150070000 A | 6/2015 |

OTHER PUBLICATIONS

Jun-feng Sun, Research on RF MEMS Devices and Integration Technology, A Dissertation Submitted to Southeast University For the Academic Degree of Doctor of Engineering, Mar. 2019.

* cited by examiner

MEMS SWITCH, PREPARATION METHOD THEREOF, AND ELECTRONIC APPARATUS

CROSS-REFERENCE TO RELATED APPLICATION

The present application is a U.S. National Phase Entry of International Application No. PCT/CN2022/089617 having an international filing date of Apr. 27, 2022, the content of which is incorporated into this application by reference.

TECHNICAL FIELD

Embodiments of the present disclosure relate to, but are not limited to, the technical field of radio frequency electronics, and in particular relate to a MEMS switch, a preparation method thereof, and an electronic apparatus.

BACKGROUND

A Micro-Electro-Mechanical System (MEMS) refers to a system in which a variety of components are designed, manufactured and integrated in the micron scale, and which is suitable for low-cost mass production. Radio Frequency Micro-Electro-Mechanical System (RF MEMS) is one of important application fields of MEMS technology. RF MEMS is used for signal processing in radio frequency (RF) and microwave frequency circuits, which is a technology that will have a significant impact on the existing RF structures in radar and communication, and lay a technical foundation for achieving miniaturization, lightweight, integration, modularization, low cost and performance improvement of RF, microwave and millimeter wave electronic systems. In RF MEMS devices, RF MEMS switch is the most concerned, which is the core of RF MEMS devices. RF MEMS switches are micro-mechanical switches operating in a range of RF to millimeter wave frequencies, which rely on mechanical movement to achieve on/off control of transmission lines. RF MEMS switches are widely used in communication systems, and are important control components in radar, electronic countermeasures, wireless communication and other fields.

SUMMARY

The following is a summary of subject matters described herein in detail. The summary is not intended to limit the protection scope of claims.

In one aspect, an embodiment of the present disclosure provides a Micro-Electro-Mechanical System (MEMS) switch, including: a substrate, a coplanar waveguide line structure disposed on a side of the substrate, an isolation structure disposed on a side of the coplanar waveguide line structure away from the substrate, and a film bridge disposed on a side of the isolation structure away from the substrate. The coplanar waveguide line structure includes a first wire, a first Direct Current (DC) bias line, a second wire, a second DC bias line and a third wire that are arranged at intervals sequentially; the second wire is one of a radio frequency (RF) signal transmission line and a ground line, and the first wire and the third wire are the other one of the RF signal transmission line and the ground line. The film bridge is crossed between the first wire and the third wire and is connected with the first wire and the third wire respectively.

In another aspect, an embodiment of the present disclosure further provides an electronic apparatus, including the MEMS switch according to the aforementioned embodiment.

In another aspect, an embodiment of the present disclosure further provides a method for preparing a MEMS switch, including:

sequentially forming a coplanar waveguide line structure and an isolation structure on a substrate, wherein the coplanar waveguide line structure includes a first wire, a first DC bias line, a second wire, a second DC bias line and a third wire arranged at intervals sequentially; the second wire is one of a Radio Frequency (RF) signal transmission line and a ground line, and the first wire and the third wire are the other one of the RF signal transmission line and the ground line;

forming a sacrifice layer on the coplanar waveguide line structure and the isolation structure;

forming a film bridge on the sacrifice layer, wherein the film bridge is crossed between the first wire and the third wire and is respectively connected with the first wire and the third wire; and removing the sacrifice layer and retaining the film bridge.

Other characteristics and advantages of the present disclosure will be set forth in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and detailed description.

BRIEF DESCRIPTION OF DRAWINGS

The drawings are used for providing understanding of technical solutions of the present disclosure, constitute a part of the specification and together with the embodiments of the present disclosure, are used for explaining the technical solutions of the present disclosure but do not form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
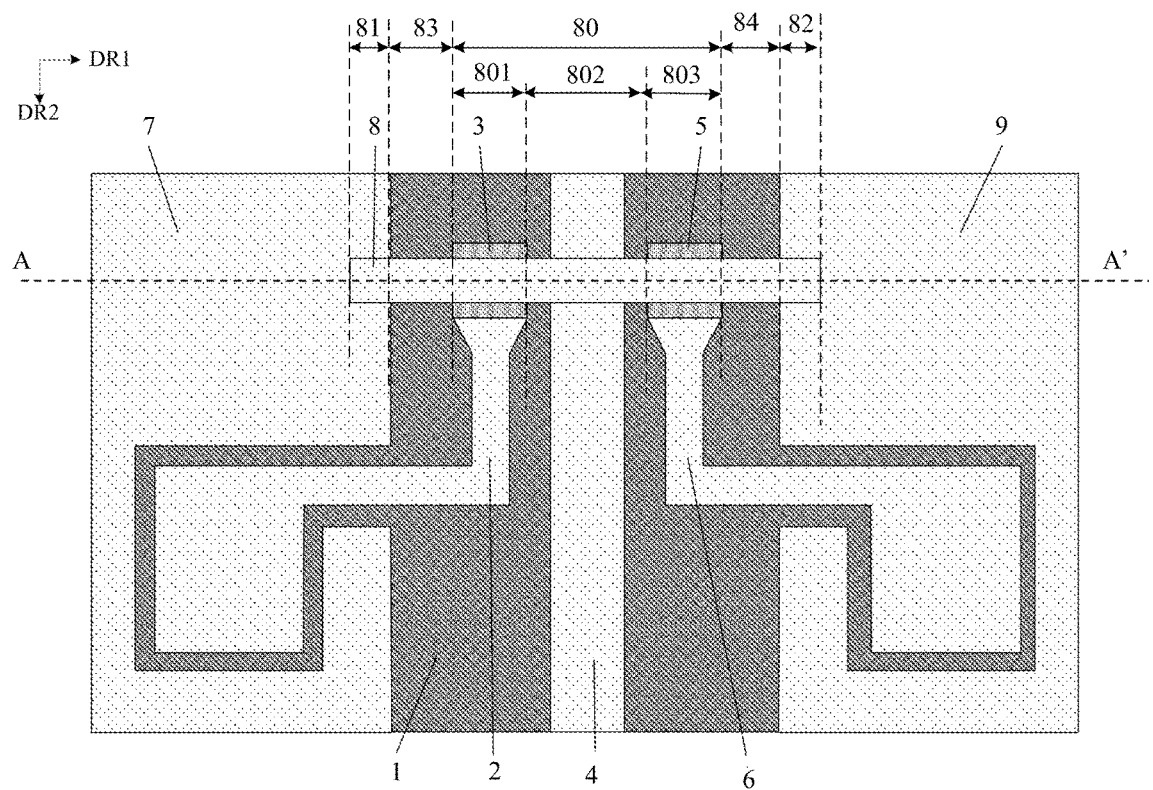
FIG. 1 is a schematic diagram of a first plane structure of a MEMS switch in an exemplary embodiment of the present disclosure.

To make objectives, technical solutions, and advantages of the present disclosure clearer, the embodiments of the present disclosure will be described in detail with reference to the accompanying drawings. It is to be noted that implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in the actual process, but are not limited thereto. For example, the width-length ratio of the channel, the thickness and spacing of each film layer may be adjusted according to actual needs. For example, in the drawings, a dimension of each constituent element, a thickness of a layer, or an area is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one implementation of the present disclosure is not limited to the shapes, numerical values, or the like shown in the drawings.

The "first", "second", "third" and other ordinal numbers in the exemplary embodiments of the present disclosure are used to avoid confusion of constituent elements, not to provide any quantitative limitation.

In the exemplary embodiments of the present disclosure, for the sake of convenience, wordings such as "central", "upper", "lower", "front", "rear", "vertical", "horizontal", "top", "bottom", "inner", "outer" and the others describing the orientations or positional relations are used to depict the relationship of constituent elements with reference to the drawings, which are only for an easy and simplified description of the present disclosure, rather than for indicating or implying that the device or element referred to must have a specific orientation, or must be constructed and operated in a particular orientation and therefore, those wordings cannot be construed as limitations on the present disclosure. The positional relationships between the constituent elements may be changed as appropriate according to a direction which is used for describing each constituent element. Therefore, appropriate replacements may be made according to situations without being limited to the wordings described in the specification.

In the exemplary embodiments of the present disclosure, the terms "install", "connect" and "couple" shall be broadly understood unless otherwise explicitly specified and defined. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the exemplary embodiments of the present disclosure, "an electrical connection" includes a case where constituent elements are connected via an element having a certain electrical action. The "element with the certain electrical effect" is not particularly limited as long as electrical signals may be sent and received between the connected constituent elements. For example, "the element with the certain electrical effect" may be an electrode or wiring, or a switch element, such as a transistor, or other functional elements, such as a resistor, an inductor, a capacitor, or the like.

In the exemplary embodiments of the present disclosure, "parallel" refers to a state in which two straight lines form an angle of −10 degrees or more and 10 degrees or less, and thus also includes a state in which the angle is −5 degrees or more and 5 degrees or less. In addition, "perpendicular" refers to a state in which an angle formed by two straight lines is 80° or more and 100° or less, and thus also includes a state in which the angle is 85° or more and 95° or less.

Triangle, rectangle, trapezoid, pentagon and hexagon in the exemplary embodiment of the present disclosure are not strictly defined, and they may be approximate triangle, rectangle, trapezoid, pentagon or hexagon, etc. There may be some small deformation caused by tolerance, and there may be chamfer, arc edge and deformation, etc.

In the exemplary embodiments of the present disclosure, "about" means that there is not strict limit for a value, and values within an error range during processes and measurement are allowed.

An "integrated structure" in the exemplary embodiments of the present disclosure may refer to a structure formed by two (or more) structures which are formed by the same deposition process and are patterned by the same composition process so as to connect to each other, and their materials may be the same or different.

Here, in the exemplary embodiments of the present disclosure, "same layer arrangement" is referred to a structure formed by two (or more) structures formed by the same deposition process and patterned through the same composition process, and their materials may be the same or different. For example, the materials of the precursors forming multiple structures arranged in the same layer are the same, and the resulting materials may be the same or different.

In an exemplary embodiment of the present disclosure, a first direction DR1 may refer to an extension direction of a film bridge, a second direction DR2 may refer to a direction intersecting the extension direction of the film bridge, and a third direction DR3 may refer to a direction perpendicular a the plane of an MEMS switch or a thickness direction of the MEMS switch or the like. Herein, the first direction DR1 intersects the second direction DR2, and the first direction DR1 intersects the third direction DR3. For example, the first direction DR1 and the second direction DR2 may be perpendicular to each other, and the first direction DR1 and the third direction DR3 may be perpendicular to each other.

An embodiment of the present disclosure provides a MEMS switch, and the MEMS switch may include: a substrate, a coplanar waveguide line structure disposed on a side of the substrate, an isolation structure disposed on a side of the coplanar waveguide line structure (CPW) away from the substrate, and a film bridge disposed on a side of the isolation structure away from the substrate. The coplanar waveguide line structure may include: a first wire, a first Direct Current (DC) bias line, a second wire, a second DC bias line and a third wire arranged at intervals sequentially. The film bridge is crossed between the first wire and the third wire, and is connected with the first wire and the third wire, respectively. The second wire is one of a radio frequency (RF) signal transmission line and a ground line, and the first wire and the third wire are the other one of an RF signal transmission line and a ground line.

Thus, in the MEMS switch provided in the exemplary embodiment of the present disclosure, when the second wire is an RF signal transmission line and both the first wire and the third wire are the ground line, the coplanar waveguide line structure adopts a design of a "ground line-bias line-signal line-bias line-ground line" structure. When the second wire is one of the ground lines, and the first wire and the third wire are both the RF signal transmission line, the CPW structure adopts a design of a "signal line-bias line-ground line-bias line-signal line" structure. Compared with the design of the "ground line-signal wire-ground line" structure adopted by the coplanar waveguide structure in some technologies, in the MEMS switch provided in exemplary embodiments of the present disclosure, the coplanar waveguide structure adopts the design of the "ground line-DC bias line-signal line-DC bias line-ground line" or "signal line-DC bias line-ground line-DC bias line-signal line" structure, which can achieve the decoupling of the signal line and the DC bias line, and improve the drive performance of the MEMS switch.

In an exemplary embodiment, an isolation structure may include a first isolation layer disposed on a side of a first DC bias line away from the substrate, and a second isolation layer disposed on a side of a second DC bias line away from the substrate. In this way, by placing the isolation layer on the DC bias lines on two sides, the normal drive operation of the MEMS switch can be ensured, and the interference between the DC bias voltage and the RF signal can be reduced, thereby improving the drive performance of the MEMS switch.

In an exemplary embodiment, in a direction perpendicular to the plane of the MEMS switch, a thickness of the second wire is greater than or equal to a thickness of the first isolation layer, and the thickness of the second wire is greater than or equal to a thickness of the second isolation layer. Thus, by increasing the thickness of the second wire (which may be an RF signal transmission line, for example) in the coplanar waveguide line structure, the isolation performance of the MEMS switch can be improved.

In an exemplary embodiment, in the direction perpendicular to the plane of the MEMS switch, the thickness of the second wire is greater than or equal to a sum of a thickness of the first DC bias line and a thickness of the first isolation layer, and the thickness of the second wire is greater than or equal to a sum of a thickness of the second DC bias line and a thickness of the second isolation layer. As such, by increasing the thickness of the second wire (which may be, for example, an RF signal transmission line) in the coplanar waveguide line structure, a gap between the film bridge in a bent state and the second wire (e.g., which may be an RF signal transmission line) can be reduced. There is no risk of short circuit between the film bridge and the second wire (for example, which may be an RF signal transmission line). The electrostatic force applied by the DC bias line on the film bridge is not affected, and the capacitance of the MEMS switch increases with the decrease of the gap, which shows that the capacitance of the MEMS switch increases under the bending state of the film bridge, so the isolation performance of the MEMS switch can be improved.

In an exemplary embodiment, an orthographic projection of the first isolation layer on the substrate is located within a spacing region between an orthographic projection of the first wire on the substrate and an orthographic projection of the second wire on the substrate, and an orthographic projection of the second isolation layer on the substrate is located within a spacing region between the orthographic projection of the second wire on the substrate and an orthographic projection of the third wire on the substrate.

In an exemplary embodiment, the film bridge extends in a first direction, a size of the first isolation layer in a second direction and a size of the second isolation layer in the second direction are both greater than a size of the film bridge in the second direction, wherein the second direction intersects the first direction.

In an exemplary embodiment, when the second wire is an RF signal transmission line, the isolation structure further includes: a third isolation layer that is disposed on a surface of the RF signal transmission line away from the substrate; or, disposed on a surface of the film bridge close to the substrate. In this way, the isolation layer is provided between the RF signal transmission line and the film bridge, which can effectively avoid the parasitic effect caused by metal contact and form a capacitive RF MEMS switch, which is suitable for a high frequency signal transmission system.

In an exemplary embodiment, when the third isolation layer is disposed on the surface of the RF signal transmission line away from the substrate, the third isolation layer, the first isolation layer, and the second isolation layer are an integrated structure connecting to each other; or, when the third isolation layer is disposed on the surface of the film bridge close to the substrate, the first isolation layer, the third isolation layer, and the second isolation layer are spaced in a first direction.

In an exemplary embodiment, the film bridge extends in the first direction, and the third isolation layer has a size in the first direction greater than or equal to a size of the RF signal transmission line in the first direction; or, the size of the third isolation layer in the second direction is smaller than the size of the RF signal transmission line in the second direction, and the second direction intersects the first direction; or, the thickness of the third isolation layer is less than or equal to the thickness of the RF signal transmission line in the direction perpendicular to the plane of the MEMS switch.

In an exemplary embodiment, the film bridge may include: a middle region, and a first connection region and a second connection region arranged on two sides of the middle region in the first direction, the first connection region is configured to be connected to the first wire, the second connection region is configured to be connected to the third wire, the middle region may include: a first sub-region, a second sub-region and a third sub-region connected sequentially, there is a first overlapping region between an orthographic projection of the first sub-region on the substrate and an orthographic projection of the first DC bias line on the substrate, there is a second overlapping region between an orthographic projection of the second sub-region on the substrate and an orthographic projection of the second wire on the substrate, there is a third overlapping region between an orthographic projection of the third sub-region on the substrate and the orthographic projection of the first DC bias line on the substrate, and the first overlapping region, the second overlapping region and the third overlapping region are spaced along the first direction.

In an exemplary embodiment, at least one of the first sub-region, the third sub-region, the first connection region and the second connection region has a size in the second direction equal to a size of the second sub-region in the second direction; or, at least one of the first sub-region and the third sub-region has a size in the second direction larger than a size of at least one of the second sub-region, the first connection region and the second connection region in a second direction, wherein the second direction intersects the first direction.

In an exemplary embodiment, the size of the first sub-region in the second direction is equal to the size of the third sub-region in the second direction; or, the size of the first connection region in the second direction is equal to the size of the second connection region in the second direction.

In an exemplary embodiment, in a plane parallel to the MEMS switch, the middle region is shaped as a shape of a character "H" or a character "-"; or, shapes of the first connection region and the second connection region are rectangular.

In an exemplary embodiment, an orthographic projection of the first sub-region on the substrate is within a boundary range of an orthographic projection of the first isolation layer on the substrate, and an orthographic projection of the third sub-region on the substrate is within a boundary range of an orthographic projection of the second isolation layer on the substrate.

In an exemplary embodiment, the film bridge may include: a first transition region arranged between the first connection region and the middle region, and a second transition region arranged between the middle region and the second connection region, an orthographic projection of the first transition region on the substrate is located between an orthographic projection of the first wire on the substrate and an orthographic projection of the first DC bias line on the substrate, and an orthographic projection of the second transition region on the substrate is located between an orthographic projection of the second DC bias line on the substrate and an orthographic projection of the third wire on the substrate.

In an exemplary embodiment, the first transition region and the second transition region are one or more of a region with an opening and a region without an opening.

In an exemplary embodiment, the region with an opening includes: at least one of a first groove provided on a first edge of the region with an opening, a second groove provided on a second edge of the region with an opening, and a through hole provided between the first edge and the second edge, the first edge and the second edge extend along the first direction and are disposed opposite to each other along a second direction, wherein the second direction intersects the first direction. Thus, since the position where the electrostatic drive force is generated is located in the middle region between the first transition region and the second transition region, then, by arranging through holes or grooves on two sides of the position where the drive force is generated of the film bridge, the overall bending stiffness of the film bridge can be reduced, thereby achieving the design goals of response time and pull-down displacement under a specific electrostatic drive force, and further improving the drive performance of the MEMS switch.

In an exemplary embodiment, a size of a through hole in the second direction is less than or equal to 0.75 times a distance between the first edge and the second edge; or, in the plane parallel to the MEMS switch, an area of the through hole is less than or equal to 0.6 times of an area of a transition region where the through hole is located; and the transition region is any one of the first transition region and the second transition region.

In an exemplary embodiment, a size of a groove in the second direction is less than or equal to 0.75 times a distance between the first edge and the second edge; or, in the plane parallel to the MEMS switch, an area of the groove is less than or equal to 0.6 times of an area of a transition region where the through hole is located; or, in two adjacent grooves in the same transition region, a size of any one of the two grooves in the first direction is equal to a size of a spacing region between the two grooves in the first direction, the groove includes at least one of the first groove and the second groove, and the transition region includes any one of the first transition region and the second transition region.

In an exemplary embodiment, in a plane parallel to the MEMS switch, a shape of the through hole is any one of a circle, an ellipse, a triangle, a rectangle, a diamond, a trapezoid, a pentagon, and a hexagon; or, a shape of at least one of the first groove and the second groove is any one of an arc, a triangle, a rectangle, a trapezoid, a pentagon and a hexagon.

In an exemplary embodiment, at least one of the first transition region and the second transition region has a size in the second direction equal to a size of the second sub-region in the second direction; or, at least one of the first transition region and the second transition region has a size in the second direction greater than a size of the second sub-region in the second direction, wherein the second direction intersects the first direction.

In an exemplary embodiment, the first DC bias line and the second DC bias line each include: a first bias line segment, a second bias line segment, and a third bias line segment connected sequentially; the first bias line segment and the third bias line segment each extend in the second direction, the second bias line segment extends in the first direction, wherein the second direction intersects the first direction.

In an exemplary embodiment, in a plane parallel to the MEMS switch, when the second wire is an RF signal transmission line, a shape of the RF signal transmission line is a long strip shape; or, when the second wire is a ground line, the ground line is shaped as a polyline shape. The illustrative embodiments of the present disclosure are not limited thereto.

In an exemplary embodiment, when the second wire is a ground line, the ground line may include a first ground line segment, a second ground line segment, and a third ground line segment connected sequentially, the first ground line segment, the second ground line segment, and the third ground line segment each have a stepped shape.

In an exemplary embodiment, the first and third ground line segments are identical in shape and are symmetrically disposed about a center point, and the second ground line segment is symmetrically disposed about a center point, wherein the center point is a geometric center of the substrate.

In an exemplary embodiment, when the second wire is an RF signal transmission line, the ground line may include a ground having a rectangular shape and a ground line segment having a shape of a character "C" and connected to the ground.

In an exemplary embodiment, in a plane parallel to the MEMS switch, the shape of the RF signal transmission line may be rectangular when the second wire is a ground line.

In an exemplary embodiment, when the second wire is an RF signal transmission line, the substrate has a center line extending in the second direction, the second wire is symmetrically disposed about the center line, the first and second DC bias lines are symmetrically disposed about the center line, and the first and third wires are symmetrically disposed about the center line.

In an exemplary embodiment, when the second wire is a ground line, the second wire is symmetrically disposed about a center point, the first and second DC bias lines are symmetrically disposed about the center point, and the first and third wires are symmetrically disposed about the center point, wherein the center point is the geometric center of the substrate.

The MEMS switch provided by the embodiments of the present disclosure will be described below with reference to the accompanying drawings.

Figure 2:
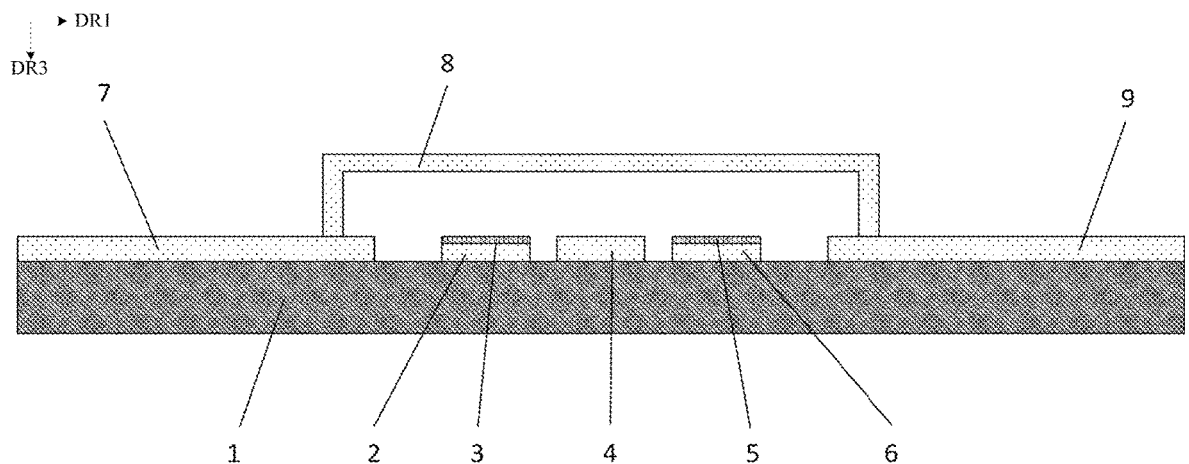
FIG. 2 is a schematic cross-sectional view of the MEMS switch shown in FIG. 1 in a voltage unapplied state along the AA' direction.
Figure 3:
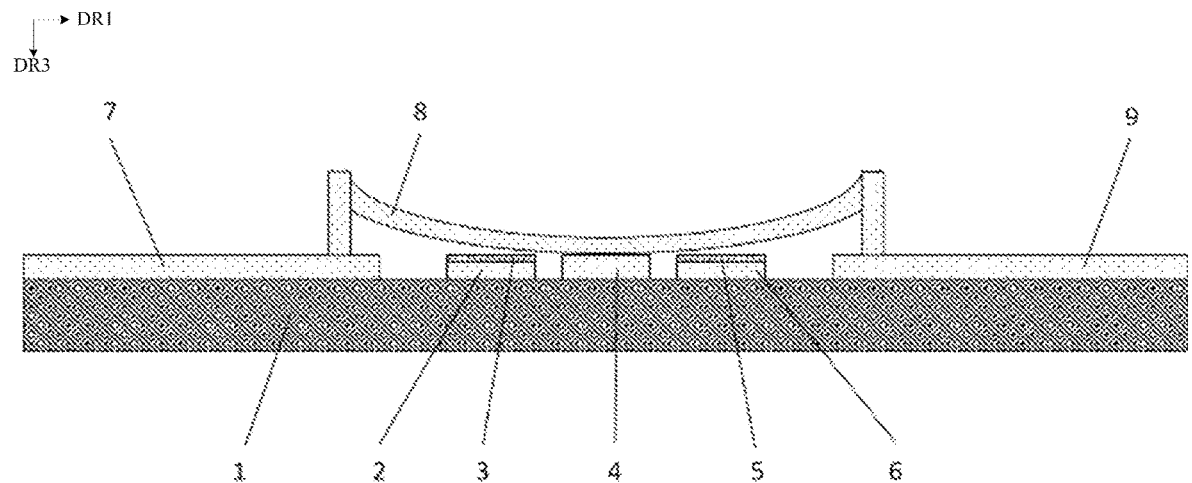
FIG. 3 is a schematic cross-sectional view of the MEMS switch shown in FIG. 1 in a voltage applied state along the AA' direction.
Figure 4:
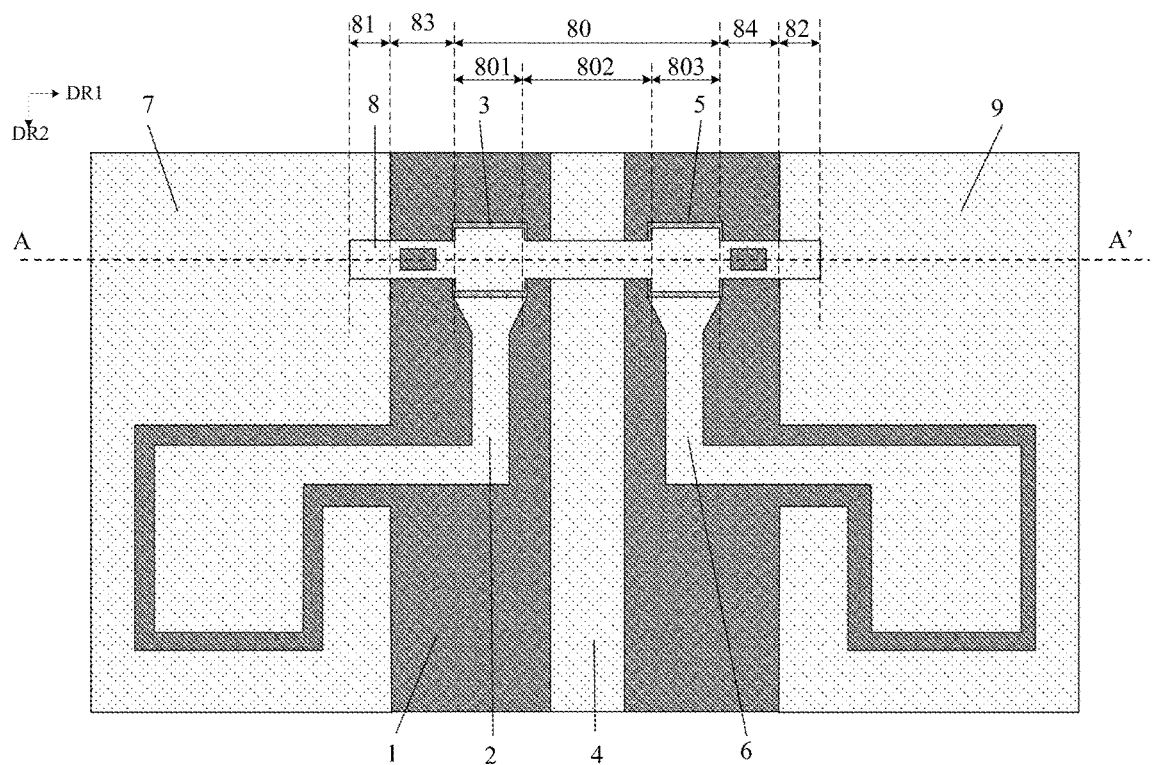
FIG. 4 is a schematic diagram of a second plane structure of a MEMS switch in an exemplary embodiment of the present disclosure.
Figure 5:
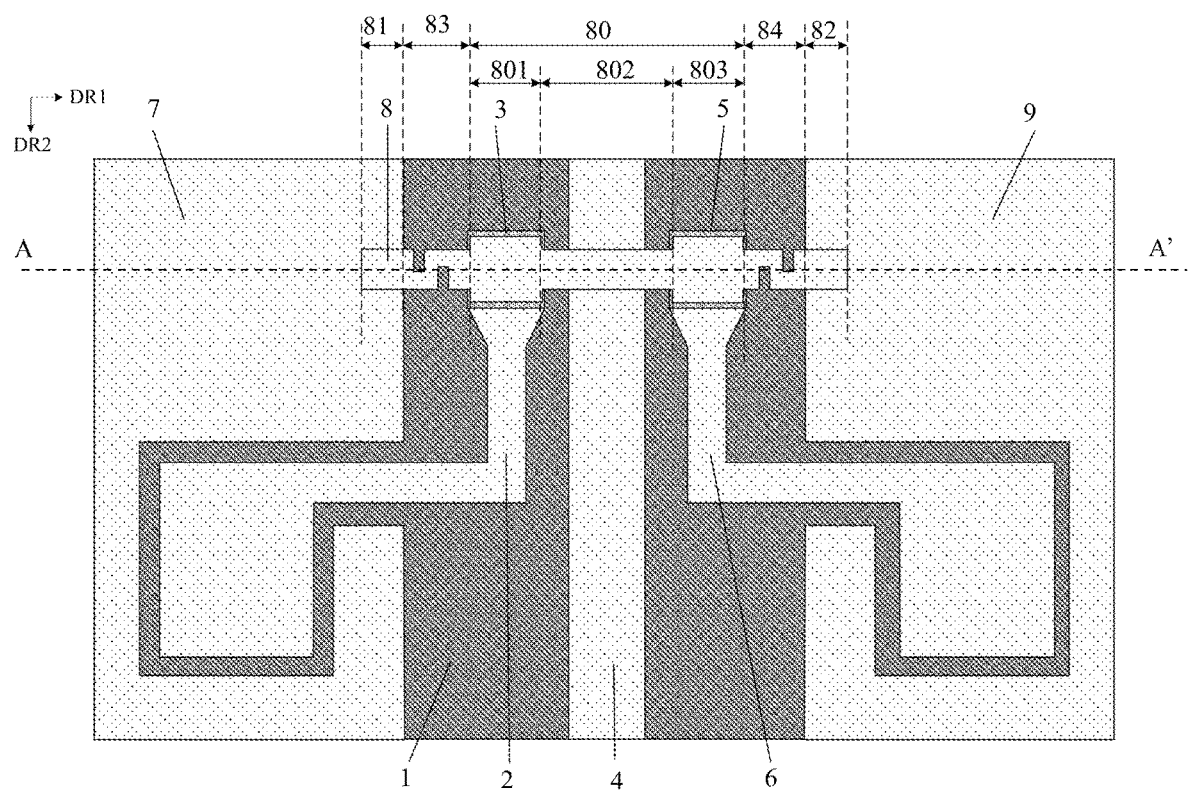
FIG. 5 is a schematic diagram of a third plane structure of a MEMS switch in an exemplary embodiment of the present disclosure.

FIG. 1 is a schematic diagram of a first plane structure of a MEMS switch in an exemplary embodiment of the present disclosure. FIG. 2 is a schematic cross-sectional view of the MEMS switch shown in FIG. 1 in a voltage unapplied state along the AA' direction. FIG. 3 is a schematic cross-sectional view of the MEMS switch shown in FIG. 1 in a voltage applied state along the AA' direction. FIG. 4 is a schematic diagram of a second plane structure of a MEMS switch in an exemplary embodiment of the present disclosure. FIG. 5 is a schematic diagram of a third plane structure of a MEMS switch in an exemplary embodiment of the present disclosure. In FIG. 1 to FIG. 5 illustrations are made by using a second wire as an RF signal transmission line, a first wire as a first ground line, and a second wire as a second ground line.

In an exemplary embodiment, as shown in FIGS. 1 to 5, in a plane perpendicular to a substrate 1, the MEMS switch may include the substrate 1, a coplanar waveguide line structure disposed on a side of the substrate 1, an isolation structure disposed on a side of the coplanar waveguide line structure away from the substrate 1, and a film bridge 8 disposed on a side of the isolation structure away from the substrate 1. In a plane parallel to the substrate 1, the coplanar waveguide line structure may include: a first wire 7, a first DC bias line 2, a second wire 4, a second DC bias line 6 and a third wire 9. The second wire 4 may be serve as an RF signal transmission line, the first wire 7 may serve as a first ground line, the second wire 4 may serve as a second ground line. The RF signal transmission line is located at a center position, the first DC bias line 2 and the second DC bias line 6 are located at two sides of the RF signal transmission line in a first direction DR1, the first ground line is located on a side of the first DC bias line 2 away from the RF signal transmission line, and the second ground line is located on a side of the second DC bias line 6 away from the RF signal transmission line. The isolation structure may include a first isolation layer 3 and a second isolation layer 5. In a plane perpendicular to the substrate 1, the first isolation layer 3 is disposed on a side of the first DC bias line 2 away from the substrate 1, and the second isolation layer 5 is disposed on a side of the second DC bias line 6 away from the substrate 1. The film bridge 8 is crossed and suspended over the first ground line, the first isolation layer 3, the RF signal transmission line, the second isolation layer 5 and the second ground line in the first direction DR1, and one terminal of the film bridge 8 is connected to the first ground line, and the other terminal of the film bridge 8 is connected to the second ground line.

As such, in the MEMS switch provide in the exemplary embodiments of the present disclosure, the coplanar waveguide structure adopts a design of a "ground line-bias line-signal line-bias line-ground line" structure. Compared with the design of the "ground line-signal wire-ground line" structure adopted by the coplanar waveguide structure in some technologies, in the MEMS switch provided in exemplary embodiments of the present disclosure, the coplanar waveguide structure adopts the design of the "ground line-DC bias line-signal line-DC bias line-ground line" structure, which can achieve the decoupling of the signal line and the DC bias line, and can ensure the normal drive operation of the MEMS switch and reduce the interference between the DC bias voltage and the radio frequency signal by placing an isolation layer on the DC bias lines at two sides, thereby improving the drive performance of the MEMS switch.

In an exemplary embodiment, as shown in FIGS. 1, 4 and 5, a cross-sectional shape of the film bridge 8 may be a strip shape extending in the first direction DR1.

In an exemplary embodiment, as shown in FIGS. 1, 4 and 5, the film bridge 8 may include: a middle region 80, and a first connection region 81 and a second connection region 82 arranged on two sides of the middle region 80 in the first direction DR1, the first connection region 81 is configured to be connected to the first wire 7, and the second connection region 82 is configured to be connected to the third wire 9. The middle region 80 may include: a first sub-region 801, a second sub-region 802 and a third sub-region 803 connected sequentially, there is a first overlapping region between an orthographic projection of the first sub-region 801 on the substrate 1 and an orthographic projection of the first DC bias line 2 on the substrate 1, there is a second overlapping region between an orthographic projection of the second sub-region 802 on the substrate 1 and an orthographic projection of the second wire 4 on the substrate 1, there is a third overlapping region between an orthographic projection of the third sub-region 803 on the substrate 1 and the orthographic projection of the first DC bias line 2 on the substrate 1, and the first overlapping region, the second overlapping region and the third overlapping region are spaced along the first direction DR1.

In an exemplary embodiment, at least one of the first sub-region 801, the third sub-region 803, the first connection region 81 and the second connection region 82 has a size in a second direction DR2 equal to a size of the second sub-region 802 in the second direction DR2; or, at least one of the first sub-region 801 and the third sub-region 803 has a size in the second direction DR2 larger than a size of at least one of the second sub-region 802, the first connection region 81 and the second connection region 82 in the second direction DR2, wherein the second direction DR2 intersects the first direction DR1. For example, as shown in FIG. 1, the size of the first sub-region 801 in the second direction DR2, the size of the third sub-region 803 in the second direction DR2, the size of the first connection region 81 in the second direction DR2, the size of the second connection region 82 in the second direction DR2, and the size of the second sub-region 802 in the second direction DR2 are equal. For example, as shown in FIGS. 4 and 5, the sizes of the first connection region 81 in the second direction DR2 and the second connection region 82 in the second direction DR2 are both larger than the size of the second connection region 82 in the second direction DR2. The sizes of the first connection region 81 in the second direction DR2 and the second connection region 82 in the second direction DR2 are both larger than the size of the first connection region 81 in the second direction DR2, and the sizes of the first connection region 81 in the second direction DR2 and the second connection region 82 in the second direction DR2 are both larger than the size of the second connection region 82 in the second direction DR2. Here, the embodiments of the present disclosure are not limited to this.

In an exemplary embodiment, as shown in FIGS. 1, 4, and 5, the size of the first sub-region 801 in the second direction DR2 and the size of the third sub-region 803 in the second direction DR2 may be equal.

In an exemplary embodiment, as shown in FIGS. 1, 4, and 5, the size of the first connection region 81 in the second direction DR2 and the size of the second connection region 82 in the second direction DR2 may be equal.

In an exemplary embodiment, in a plane parallel to the MEMS switch, as shown in FIGS. 4 and 5, the shape of the middle region 80 may be shaped as a shape of a character "H". Alternatively, as shown in FIG. 1, the shape of the middle region 80 may be shaped as a shape of a character "-". Certainly, the shape of the middle region 80 is not limited thereto, and may also be other shapes, which are not limited in the embodiments of the present disclosure.

In an exemplary embodiment, the shapes of the first and second connection regions 81 and 82 may both be rectangular in a plane parallel to the MEMS switch.

In an exemplary embodiment, an orthographic projection of the first sub-region 801 on the substrate 1 is within a boundary range of an orthographic projection of the first isolation layer on the substrate 1, and an orthographic projection of the third sub-region 803 on the substrate 1 is within a boundary range of an orthographic projection of the second isolation layer on the substrate 1.

In an exemplary embodiment, as shown in FIGS. 1, 4 and 5, the film bridge 8 may also include: a first transition region 83 provided between the first connection region 81 and the middle region 80, and a second transition region 84 provided between the middle region 80 and the second connection region 82. An orthographic projection of the first transition region 83 on the substrate 1 is located between an orthographic projection of the first wire 7 on the substrate 1 and an orthographic projection of the first DC bias line 2 on the substrate 1, and an orthographic projection of the second transition region 84 on the substrate 1 is located between an orthographic projection of the second DC bias line 6 on the substrate 1 and an orthographic projection of the third wire 9 on the substrate 1.

In an exemplary embodiment, the first transition region 83 and the second transition region 84 are one or more of a region with an opening and a region without an opening. For example, as shown in FIG. 1, the first transition region 83 and the second transition region 84 may both be the region without an opening. For example, as shown in FIGS. 4 and 5, the first transition region 83 and the second transition region 84 may both be a region with an opening. In this way, since the position where the electrostatic drive force is generated is located in the middle region 80, then, by setting the transition regions on both sides of the position, where the drive force is generated, of the film bridge 88 as regions with an opening, the overall bending stiffness of the film bridge 88 can be reduced, thereby achieving the design goals of response time and pull-down displacement under a specific electrostatic drive force, and further improving the drive performance of the MEMS switch.

In an exemplary embodiment, the region with an opening may include: at least one of a first groove provided on a first edge of the region with an opening, a second groove provided on a second edge of the region with an opening, and a through hole provided between the first edge and the second edge, the first edge and the second edge extend along the first direction DR1 and are disposed opposite to each other along a second direction DR2, wherein the second direction DR1 intersects the first direction DR1. For example, the number of the first grooves may be one or more. For example, the number of second grooves may be one or more. For example, the number of through holes may be one or more. Here, the embodiments of the present disclosure are not limited to this. For example, through holes and grooves may penetrate the film layer where the film bridge 8 is located.

For example, the first transition region 83 and the second transition region 84 are both the region with an opening, and as shown in FIG. 4, a through hole may be provided in both the first transition region 83 and the second transition region 84. Thus, since the position where the electrostatic drive force is generated is located in the middle region 80 between the first transition region 83 and the second transition region 84, then, by arranging through holes on two sides of the position, where the drive force is generated, of the film bridge 88, the overall bending stiffness of the film bridge 88 can be reduced, thereby achieving the design goals of response time and pull-down displacement under a specific electrostatic drive force, and further improving the drive performance of the MEMS switch.

For example, both the first transition region 83 and the second transition region 84 are the region with an opening, as shown in FIG. 5, a first groove and a second groove may be provided in both the first transition region 83 and the second transition region 84. Thus, since the position where the electrostatic drive force is generated is located in the middle region 80 between the first transition region 83 and the second transition region 84, then, by arranging grooves on two sides of the position, where the drive force is generated, of the film bridge 88, the overall bending stiffness of the film bridge 88 can be reduced, thereby achieving the design goals of response time and pull-down displacement under a specific electrostatic drive force, and further improving the drive performance of the MEMS switch.

In an exemplary embodiment, the size of the through hole in the second direction DR2 is less than or equal to 0.75 times the distance between the first edge and the second edge.

In an exemplary embodiment, when a through hole is provided in the first transition region 83, an orthographic projection of the through hole on the substrate 1 does not overlap with an orthographic projection of the first wire 7 on the substrate 1, and the orthographic projection of the through hole on the substrate 1 does not overlap with an orthographic projection of the first isolation layer on the substrate 1. Alternatively, when the through hole is provided in the second transition region 84, an orthographic projection of the through hole on the substrate 1 does not overlap with an orthographic projection of the third wire 9 on the substrate 1, and the orthographic projection of the through hole on the substrate 1 does not overlap with an orthographic projection of the second isolation layer on the substrate 1.

In an exemplary embodiment, in the plane parallel to the MEMS switch, an area of the through hole is less than or equal to 0.6 times of an area of the transition region where the through hole is located, and the transition region is any one of the first transition region 83 and the second transition region 84.

In an exemplary embodiment, a size of the groove in the second direction DR2 is less than or equal to 0.75 times the distance between the first edge and the second edge.

In an exemplary embodiment, in a plane parallel to the MEMS switch, an area of a groove is less than or equal to 0.6 times an area of a transition region where the through hole is located, the groove may include at least one of the first groove and the second groove, and the transition region may include any one of the first transition region 83 and the second transition region 84.

In an exemplary embodiment, in two adjacent grooves in the same transition region, a size of any one of the two grooves in the first direction DR1 is equal to a size of a spacing region between the two grooves in the first direction DR1, the groove may include at least one of the first groove and the second groove, and the transition region may include any one of the first transition region 83 and the second transition region 84. For example, as shown in FIG. 5, taking a case where two grooves may be provided in both the first transition region 83 and the second transition region 84 as an example, the two grooves may include a first groove and a second groove.

In an exemplary embodiment, in a plane parallel to the MEMS switch, a shape of the through hole may be any one of a circle, an ellipse, a triangle, a rectangle, a diamond, a trapezoid, a pentagonal, and a hexagon. For example, as shown in FIG. 4, taking a case where a through hole is provided in both the first transition region 83 and the second transition region 84 as an example, the shape of the through hole may be rectangular. Here, the embodiments of the present disclosure are not limited to this.

In an exemplary embodiment, at least one of the first groove and the second groove may have a shape of any one of an arc, a triangle, a rectangle, a trapezoid, a pentagon, and a hexagon in a plane parallel to the MEMS switch. For example, as shown in FIG. 5, taking a case where a first groove and a second groove may be provided in both the first transition region 83 and the second transition region 84 as an example, the shapes of the first groove and the second groove may both be rectangular. For example, as shown in FIG. 5, the sizes of the first groove and the second groove may be the same for each transition region. Here, the embodiments of the present disclosure are not limited to this.

In an exemplary embodiment, at least one of the first transition region 83 and the second transition region 84 has a size in the second direction DR2 equal to a size of the second sub-region 802 in the second direction DR2; alternatively, at least one of the first transition region 83 and the second transition region 84 has a size in the second direction DR2 greater than the size of the second sub-region 802 in the second direction DR2, wherein the second direction DR2 intersects the first direction DR1. For example, as shown in FIG. 1, the size of the first transition region 83 in the second direction DR2 and the size of the second transition region 84 in the second direction DR2 are both equal to the size of the second sub-region 802 in the second direction DR2. For another example, as shown in FIGS. 4 and 5, the size of the first transition region 83 in the second direction DR2 and the size of the second transition region 84 in the second direction DR2 are both larger than the size of the second sub-region 802 in the second direction DR2. Here, the embodiments of the present disclosure are not limited to this.

In an exemplary embodiment, as shown in FIGS. 1, 4, and 5, the size of the first transition region 83 in the second direction DR2 and the size of the second transition region 84 in the second direction DR2 may be equal.

In an exemplary embodiment, as shown in FIGS. 2 and 3, in a direction perpendicular to the plane of the MEMS switch (i.e., the third direction DR3), the thickness of the RF signal transmission line (i.e., the second wire 4) is greater than or equal to the thickness of the first isolation layer 3, and the thickness of the RF signal transmission line (i.e., the second wire 4) is greater than or equal to the thickness of the second isolation layer 5. Thus, by increasing the thickness of the RF signal transmission line (i.e., the second wire 4) in the coplanar waveguide line structure, the gap between the film bridge 8 and the RF signal transmission line (i.e., the second wire 4) in the bent state can be reduced. There is no risk of short circuit between the film bridge 8 and the RF signal transmission line (i.e., the second wire 4), and the electrostatic force applied by the DC bias line to the film bridge 8 is not affected. Moreover, the capacitance of the MEMS switch of the film bridge 8 in the bent state is increased from the relationship that the plate capacitance increases with the decrease of the gap, so that it is achieved that the isolation performance of the MEMS switch can be improved.

In an exemplary embodiment, as shown in FIGS. 2 and 3, in a direction perpendicular to the plane of the MEMS switch (i.e. the third direction DR3), the thickness of the RF signal transmission line (i.e., the second wire 4) is greater than or equal to a sum of the thickness of the first DC bias line 2 and the thickness of the first isolation layer 3, and the thickness of the RF signal transmission line (i.e., the second wire 4) is greater than or equal to a sum of the thickness of the second DC bias line 6 and the thickness of the second isolation layer 5. Thus, by increasing the thickness of the RF signal transmission line (i.e., the second wire 4) in the coplanar waveguide line structure, the gap between the film bridge 8 and the RF signal transmission line (i.e., the second wire 4) in the bent state can be reduced. There is no risk of short circuit between the film bridge 8 and the RF signal transmission line (i.e., the second wire 4), and the electrostatic force applied by the DC bias line to the film bridge 8 is not affected. Moreover, the capacitance of the MEMS switch of the film bridge 8 in the bent state is increased from the relationship that the plate capacitance increases with the decrease of the gap, so that it is achieved that the isolation performance of the MEMS switch can be improved. Herein, the thickness may refer to a dimensional feature along the third direction DR3.

In an exemplary embodiment, as shown in FIGS. 1 to 3, an orthographic projection of the first isolation layer 3 on the substrate 1 is located within a spacing region between an orthographic projection of the first wire 7 on the substrate 1 and an orthographic projection of the second wire 4 on the substrate 1, and an orthographic projection of the second isolation layer 5 on the substrate 1 is located within a spacing region between the orthographic projection of the second wire 4 on the substrate 1 and an orthographic projection of the third wire 9 on the substrate 1.

In an exemplary embodiment, as shown in FIGS. 1, 4 and 5, the film bridge 8 extends in the first direction DR1, the size of the first isolation layer 3 in a second direction DR2 and the size of the second isolation layer 5 in the second direction DR2 are both greater than the size of the film bridge 8 in the second direction DR2, wherein the second direction DR2 intersects the first direction DR1.

In an exemplary embodiment, as shown in FIG. 1, the first DC bias line 2 and the second DC bias line 6 each include: a first bias line segment, a second bias line segment, and a third bias line segment connected sequentially; the first bias line segment and the third bias line segment each extend in the second direction DR2, the second bias line segment extends in the first direction DR1, wherein the second direction DR2 intersects the first direction DR1. For example, a first terminal of a first transmission segment in the first DC bias line 2 may be connected to a first signal pad, which may receive a DC bias voltage from an external circuit structure (e.g. a drive IC (integrated circuit) chip) and transmit it to the first DC bias line 2. Similarly, a first terminal of the first transmission segment in the second DC bias line 6 is connected to a second signal pad, which may receive a DC bias voltage from an external circuit structure and transmit it to the second DC bias line 6. For example, the second terminal of the third transmission segment in the first DC bias line 2 and the second terminal of the third transmission segment in the second DC bias line 6 may serve as an electrostatic drive terminal. When the first DC bias line 2 and the second DC bias line 6 receive the DC bias voltage, an electrostatic drive force is applied to the film bridge 8, so that the film bridge 8 changes from a flat state to a pull-down bending state.

In an exemplary embodiment, as shown in FIG. 1, the shape of the RF signal transmission line (i.e. the second wire 4) in a plane parallel to the substrate 1 may be a strip shape extending in the second direction DR2.

In an exemplary embodiment, as shown in FIG. 1, both the first ground line (i.e. the first wire 7) and the second ground line (i.e. the second wire 49) in a plane parallel to the substrate 1 may include a ground having a rectangular shape, a ground line segment having a shape of a character "C" and connected to the ground. The film bridge 8 has a shape of a character "H" or a character "-".

In an exemplary embodiment, as shown in FIG. 1, in a plane parallel to the substrate 1, the substrate 1 has a center line extending in a second direction, and an RF signal transmission line (i.e., a second wire 4) is symmetrically disposed about the center line.

In an exemplary embodiment, as shown in FIG. 1, in a plane parallel to the substrate 1, the substrate 1 has a center line extending in a second direction, and the first DC bias line 2 and the second DC bias line 6 are disposed symmetrically about the center line.

In an exemplary embodiment, as shown in FIG. 1, in a plane parallel to the substrate 1, the substrate 1 has a center line extending in a second direction, and a first ground line (i.e., a first wire 7) and a second ground line (i.e., a second wire 49) are symmetrically disposed about the center line.

In an exemplary embodiment, the working principle of the MEMS switch shown in FIG. 1 may include: as shown in FIG. 3, when a DC bias voltage is applied to the first DC bias line 2 and the second DC bias line 6, by being subjected to an electrostatic force the film bridge 8 is moved towards the RF signal transmission line (i.e., the second wire 4), and changes from a flat straight state to a pull-down bending state. Since there is no isolation layer between the film bridge 8 and the RF signal transmission line (i.e., the second wire 4), after being bent, the film bridge 8 may be contacted with the RF signal transmission line (i.e., the second wire 4), and a radio frequency signal (e.g., microwave signal) on the RF signal transmission line (i.e., the second wire 4) is coupled to the first ground line (i.e., the first wire 7) and the second ground line (i.e., the third wire 9) on both sides through the film bridge 8, so that the MEMS switch is in an on state. As shown in FIG. 2, when a DC bias voltage is not applied to the first DC bias line 2 and the second DC bias line 6, the film bridge 8 moves in a direction away from the RF signal transmission line (i.e., the second wire 4), and changes from the pull-down bending state to the flat straight state, so that the MEMS switch is in an off state.

In an exemplary embodiment, the MEMS switch shown in FIG. 1 may be implemented as a contact MEMS switch. For example, the MEMS switch shown in FIG. 1 may be applied to low frequency bands.

Figure 6:
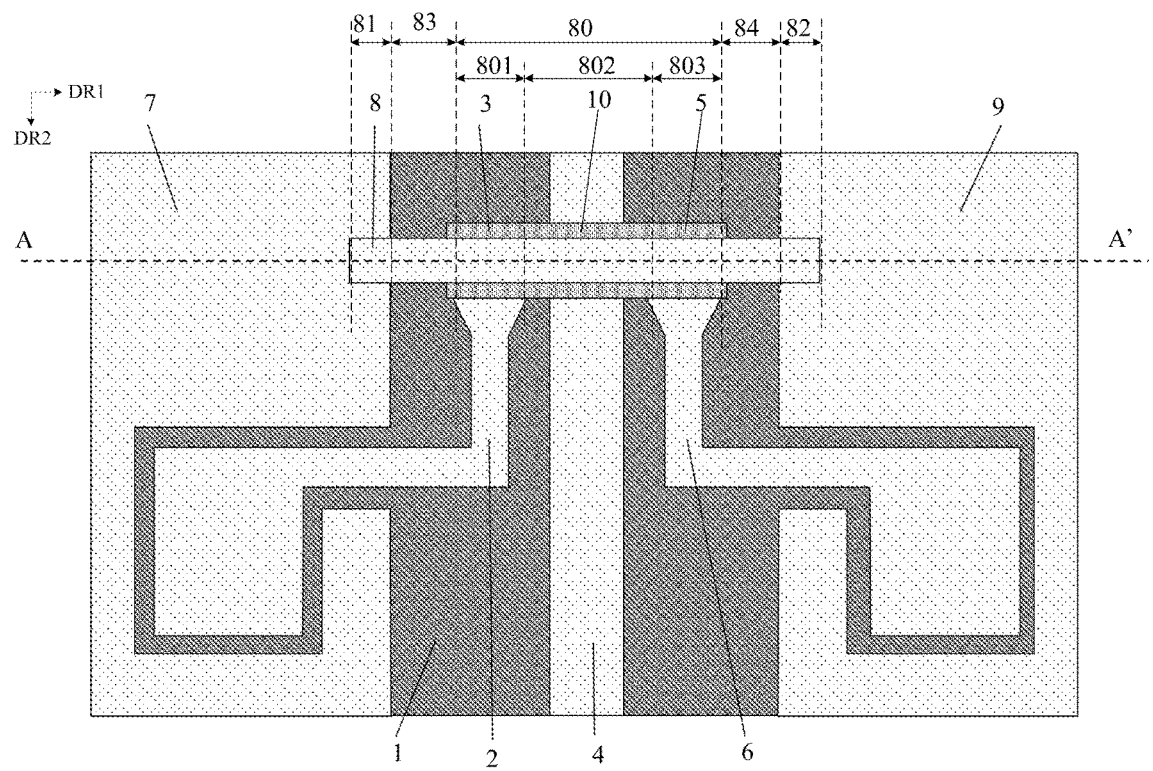
FIG. 6 is a schematic diagram of a fourth plane structure of a MEMS switch in an exemplary embodiment of the present disclosure.
Figure 7:
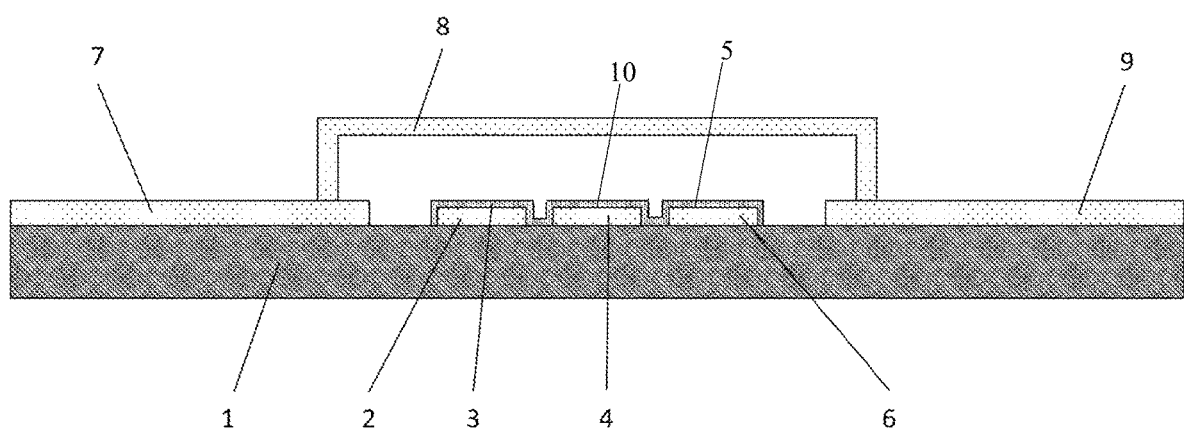
FIG. 7 is a schematic cross-sectional view of the MEMS switch shown in FIG. 6 in a voltage unapplied state along the AA' direction.
Figure 8:
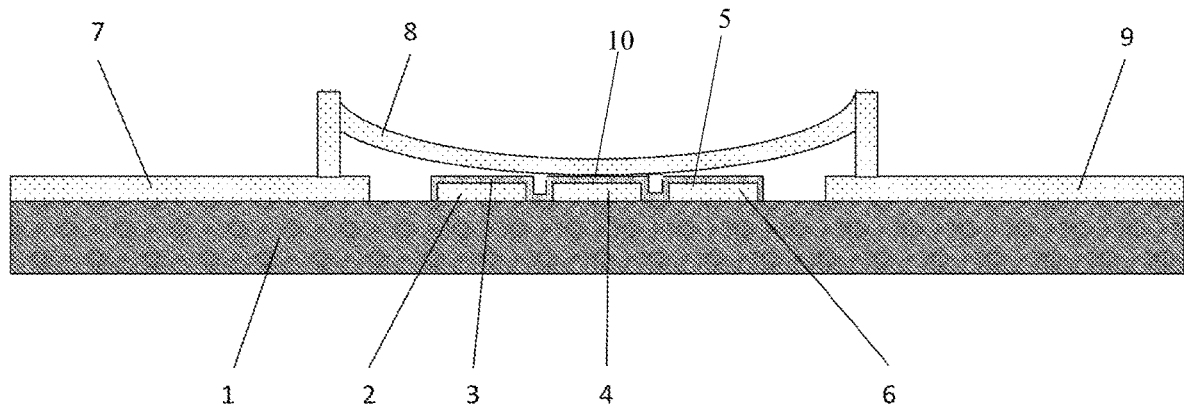
FIG. 8 is a schematic cross-sectional view of the MEMS switch shown in FIG. 6 in a voltage applied state along the AA' direction.

FIG. 6 is a schematic diagram of a fourth plane structure of a MEMS switch in an exemplary embodiment of the present disclosure. FIG. 7 is a schematic cross-sectional view of the MEMS switch shown in FIG. 6 in a voltage unapplied state along the AA' direction. FIG. 8 is a schematic cross-sectional view of the MEMS switch shown in FIG. 6 in a voltage applied state along the AA' direction. In FIG. 6 to FIG. 8, illustrations are made by taking a second wire used as an RF signal transmission line, a first wire used as a first ground line, and a second wire used as a second ground line as an example.

In an exemplary embodiment, as shown in FIGS. 6 to 8, an embodiment of the present disclosure provides a MEMS switch. In a plane perpendicular to a substrate 1, the MEMS switch may include the substrate 1, a coplanar waveguide line structure disposed on a side of the substrate 1, an isolation structure disposed on a side of the coplanar waveguide line structure away from the substrate 1, and a film bridge 8 disposed on a side of the isolation structure away from the substrate 1. In a plane parallel to the substrate 1, the coplanar waveguide line structure may include: a first wire 7, a first DC bias line 2, a second wire 4, a second DC bias line 6 and a third wire 9. The second wire 4 may serve as an RF signal transmission line, the first wire 7 may serve as a first ground line, the second wire 4 may serve as a second ground line. The RF signal transmission line is located at a center position, the first DC bias line 2 and the second DC bias line 6 are located at two sides of the RF signal transmission line in a first direction DR1, the first ground line is located on a side of the first DC bias line 2 away from the RF signal transmission line, and the second ground line is located on a side of the second DC bias line 6 away from the RF signal transmission line. The isolation structure may include a first isolation layer 3 disposed on a side of the first DC bias line 2 away from the substrate 1, a second isolation layer 5 disposed on a side of the second DC bias line 6 away from the substrate 1, and a third isolation layer 10 disposed on a surface of the RF signal transmission line away from the substrate 1. The film bridge 8 is crossed and suspended over the first ground line, the first isolation layer 3, the third isolation layer 10, the second isolation layer 5 and the second ground line in the first direction DR1, and one terminal of the film bridge 8 is connected to the first ground line, and the other terminal of the film bridge 8 is connected to the second ground line.

As such, in the MEMS switch provide in the exemplary embodiments of the present disclosure, the coplanar waveguide structure adopts a design of a "ground line-bias line-signal line-bias line-ground line" structure. Compared with the design of the "ground line-signal wire-ground line" structure adopted by the coplanar waveguide structure in some technologies, in the MEMS switch provided in exemplary embodiments of the present disclosure, the coplanar waveguide structure adopts the design of the "ground line-DC bias line-signal line-DC bias line-ground line" structure, which can achieve the decoupling of the signal line and the DC bias line, and can ensure the normal drive operation of the MEMS switch and reduce the interference between the DC bias voltage and the radio frequency signal by placing an isolation layer on the DC bias lines at two sides, thereby improving the drive performance of the MEMS switch. In addition, since the third isolation layer 10 is provided on the surface of the RF signal transmission line away from the substrate 1, the parasitic effect caused by metal contact can be effectively avoided.

In an exemplary embodiment, as shown in FIGS. 6 to 8, the first isolation layer 3, the second isolation layer 5 and the third isolation layer 10 may be an integrated structure connecting to each other.

In an exemplary embodiment, as shown in FIGS. 6 to 8, the first isolation layer 3, the second isolation layer 5, and the third isolation layer 10 may be arranged in the same layer.

In an exemplary embodiment, as shown in FIGS. 6 to 8, when the second wire 4 is an RF signal transmission line, the film bridge 8 extends in the first direction DR1 and the third isolation layer 10 has a size in the first direction DR1 greater than or equal to a size of the RF signal transmission line in the first direction DR1; alternatively, the size of the third isolation layer 10 in the second direction DR2 is smaller than the size of the RF signal transmission line in the second direction DR2, and the second direction DR2 intersects the first direction DR1; alternatively, the thickness of the third isolation layer 10 is less than or equal to the thickness of the RF signal transmission line in the direction perpendicular to the plane of the MEMS switch.

In an exemplary embodiment, as shown in FIG. 6, the film bridge 8 may include: a middle region 80, and a first connection region 81 and a second connection region 82 arranged on two sides of the middle region 80 in the first direction DR1, the first connection region 81 is configured to be connected to the first wire 7, and the second connection region 82 is configured to be connected to the third wire 9. The middle region 80 may include: a first sub-region 801, a second sub-region 802 and a third sub-region 803 connected sequentially, there is a first overlapping region between an orthographic projection of the first sub-region 801 on the substrate 1 and an orthographic projection of the first DC bias line 2 on the substrate 1, there is a second overlapping region between an orthographic projection of the second sub-region 802 on the substrate 1 and an orthographic projection of the second wire 4 on the substrate 1, there is a third overlapping region between an orthographic projection of the third sub-region 803 on the substrate 1 and the orthographic projection of the first DC bias line 2 on the substrate 1, and the first overlapping region, the second overlapping region and the third overlapping region are spaced along the first direction DR1.

For example, as shown in FIG. 6, the size of the first sub-region 801 in the second direction DR2, the size of the third sub-region 803 in the second direction DR2, the size of the first connection region 81 in the second direction DR2, the size of the second connection region 82 in the second direction DR2, and the size of the second sub-region 802 in the second direction DR2 are equal.

In an exemplary embodiment, as shown in FIG. 6, the film bridge 8 may also include: a first transition region 83 provided between the first connection region 81 and the middle region 80, and a second transition region 84 provided between the middle region 80 and the second connection region 82. An orthographic projection of the first transition region 83 on the substrate 1 is located between an orthographic projection of the first wire 7 on the substrate 1 and an orthographic projection of the first DC bias line 2 on the substrate 1, and an orthographic projection of the second transition region 84 on the substrate 1 is located between an orthographic projection of the second DC bias line 6 on the substrate 1 and an orthographic projection of the third wire 9 on the substrate 1.

In an exemplary embodiment, the first transition region 83 and the second transition region 84 are one or more of a region with an opening and a region without an opening. For example, as shown in FIG. 6, the first transition region 83 and the second transition region 84 may both be the region without an opening.

In an exemplary embodiment, the working principle of the MEMS switch shown in FIG. 6 may include: as shown in FIG. 8, when a DC bias voltage is applied to the first DC bias line 2 and the second DC bias line 6, by being subjected to an electrostatic force the film bridge 8 is moved towards the RF signal transmission line (i.e., the second wire 4), and changes from a flat straight state to a pull-down bending state. Since there is a third isolation layer 10 between the film bridge 8 and the RF signal transmission line (i.e., the second wire 4), a large capacitance may be formed, and the RF signal on the RF signal transmission line (i.e., the second wire 4) will be coupled to the first ground line (i.e., the first wire 7) and the second ground line (i.e., the third wire 9) on two sides, thereby achieving the control of the radio frequency signal and making the MEMS switch in an on state. As shown in FIG. 7, when a DC bias voltage is not applied to the first DC bias line 2 and the second DC bias line 6, the film bridge 8 moves in a direction away from the RF signal transmission line (i.e., the second wire 4), and changes from the pull-down bending state to the flat straight state, so that the MEMS switch is in an off state.

In an exemplary embodiment, the MEMS switch shown in FIG. 6 may be implemented as a capacitive RF MEMS switch. For example, the MEMS switch shown in FIG. 6 may be applied to high frequency bands, so that parasitic effects caused by metal contact can be effectively avoided for high frequency signal transmission systems.

Figure 9:
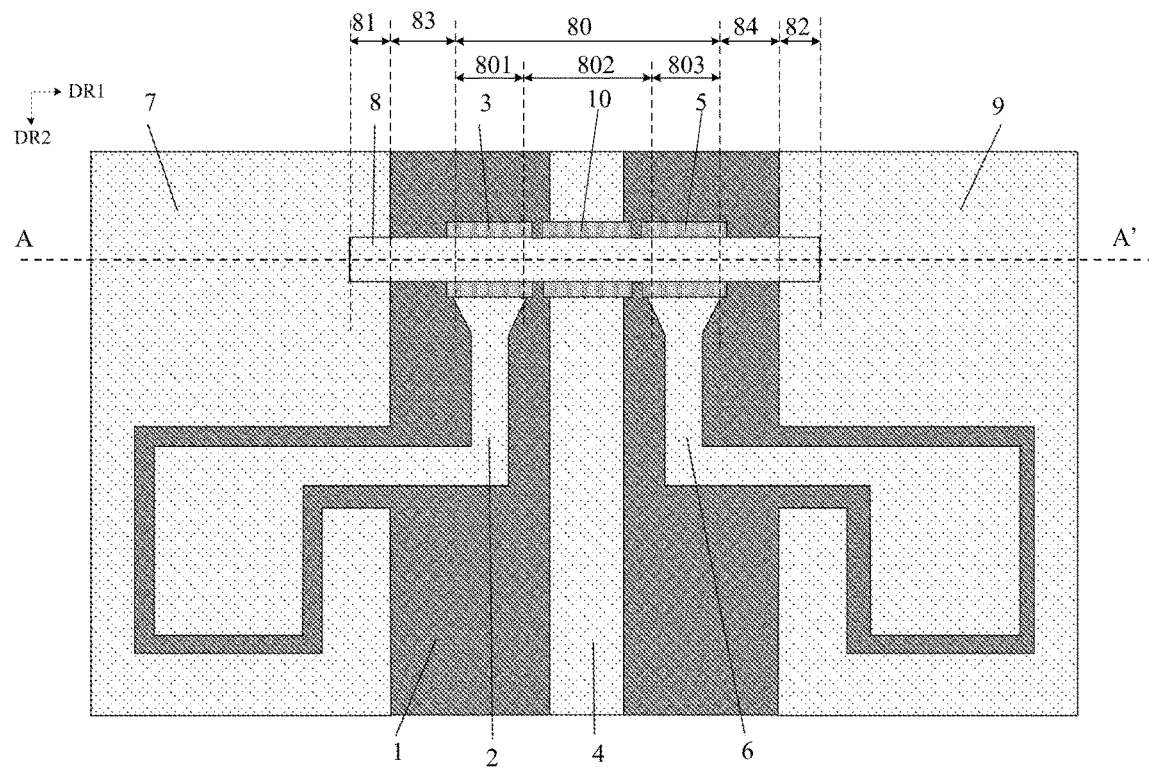
FIG. 9 is a schematic diagram of a fifth plane structure of a MEMS switch in an exemplary embodiment of the present disclosure.
Figure 10:
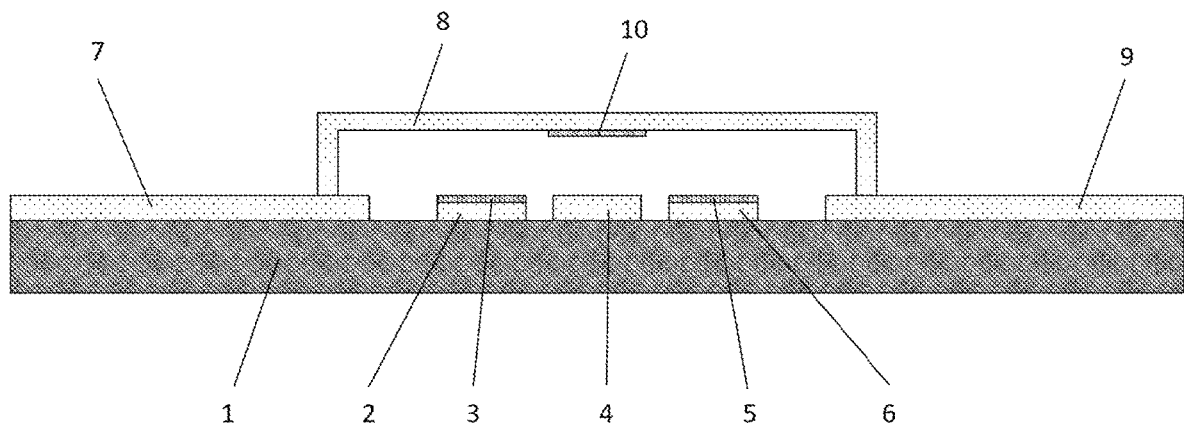
FIG. 10 is a schematic cross-sectional view of the MEMS switch shown in FIG. 9 in a voltage unapplied state along the AA' direction.
Figure 11:
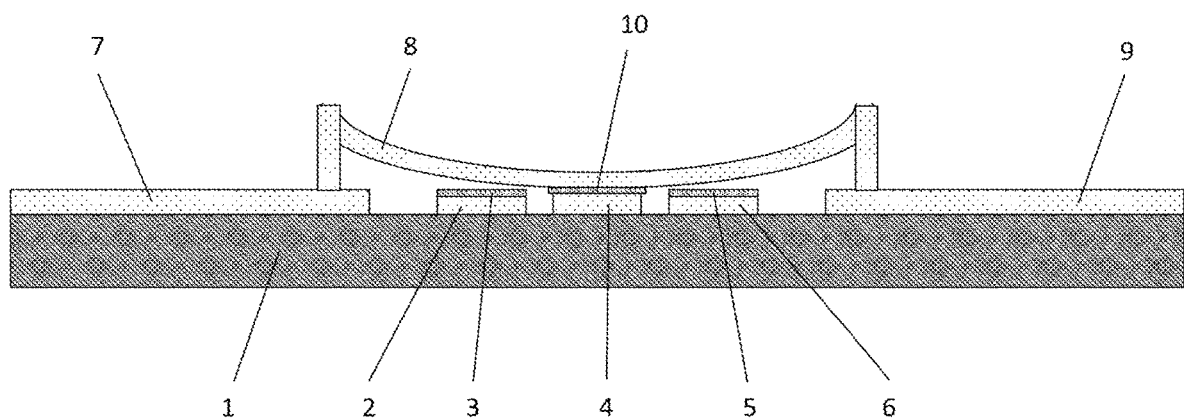
FIG. 11 is a schematic cross-sectional view of the MEMS switch shown in FIG. 9 in a voltage applied state along the AA' direction.

FIG. 9 is a schematic diagram of a fifth plane structure of a MEMS switch in an exemplary embodiment of the present disclosure. FIG. 10 is a schematic cross-sectional view of the MEMS switch shown in FIG. 9 in a voltage unapplied state along the AA' direction. FIG. 11 is a schematic cross-sectional view of the MEMS switch shown in FIG. 9 in a voltage applied state along the AA' direction. In FIG. 9 to FIG. 11, illustrations are made by taking a second wire used as an RF signal transmission line, a first wire used as a first ground line, and a second wire used as a second ground line as an example.

In an exemplary embodiment, as shown in FIGS. 9 to 11, an embodiment of the present disclosure provides a MEMS switch. In a plane perpendicular to a substrate 1, the MEMS switch may include the substrate 1, a coplanar waveguide line structure disposed on a side of the substrate 1, an isolation structure disposed on a side of the coplanar waveguide line structure away from the substrate 1, and a film bridge 8 disposed on a side of the isolation structure away from the substrate 1. In a plane parallel to the substrate 1, the coplanar waveguide line structure may include: a first wire 7, a first DC bias line 2, a second wire 4, a second DC bias line 6 and a third wire 9. The second wire 4 may serve as an RF signal transmission line, the first wire 7 may serve as a first ground line, the second wire 4 may serve as a second ground line. The RF signal transmission line is located at a center position, the first DC bias line 2 and the second DC bias line 6 are located at two sides of the RF signal transmission line in a first direction DR1, the first ground line is located on a side of the first DC bias line 2 away from the RF signal transmission line, and the second ground line is located on a side of the second DC bias line 6 away from the RF signal transmission line. The isolation structure may include a first isolation layer 3, a second isolation layer 5, and a third isolation layer 10, which are disposed at intervals. In a plane perpendicular to the substrate 1, the first isolation layer 3 is disposed on a side of the first DC bias line 2 away from the substrate 1, the second isolation layer 5 is disposed on a side of the second DC bias line 6 away from the substrate 1, and the third isolation layer 10 is disposed on a surface of the film bridge 8 close to the substrate 1. The film bridge 8 is crossed the first ground line, the first isolation layer 3, the third isolation layer 10, the second isolation layer 5 and the second ground line in the first direction DR1, and one terminal of the film bridge 8 is connected to the first ground line, and the other terminal of the film bridge 8 is connected to the second ground line.

As such, in the MEMS switch provide in the exemplary embodiments of the present disclosure, the coplanar waveguide structure adopts a design of a "ground line-bias line-signal line-bias line-ground line" structure. Compared with the design of the "ground line-signal wire-ground line" structure adopted by the coplanar waveguide structure in some technologies, in the MEMS switch provided in exemplary embodiments of the present disclosure, the coplanar waveguide structure adopts the design of the "ground line-DC bias line-signal line-DC bias line-ground line" structure, which can achieve the decoupling of the signal line and the DC bias line, and can ensure the normal drive operation of the MEMS switch and reduce the interference between the DC bias voltage and the radio frequency signal by placing an isolation layer on the DC bias lines at two sides, thereby improving the drive performance of the MEMS switch. Further, since the third isolation layer 10 is provided on the surface of the film bridge 8 close to the substrate 1, the parasitic effect caused by metal contact can be effectively avoided.

In an exemplary embodiment, as shown in FIGS. 10 to 11, the first isolation layer 3 and the second isolation layer 5 are arranged in the same layer.

In an exemplary embodiment, as shown in FIGS. 10 to 11, the first isolation layer 3, the second isolation layer 5, and the third isolation layer 10 are disposed at intervals along the first direction DR1.

In an exemplary embodiment, as shown in FIGS. 10 to 11, when the second wire 4 is an RF signal transmission line, the film bridge 8 extends in the first direction, and the third isolation layer 10 has a size in the first direction DR1 greater than or equal to a size of the RF signal transmission line in the first direction DR1; alternatively, the size of the third isolation layer in the second direction DR2 is smaller than the size of the RF signal transmission line in the second direction DR2, and the second direction DR2 intersects the first direction DR1; alternatively, the thickness of the third isolation layer 10 is less than or equal to the thickness of the RF signal transmission line in the direction perpendicular to the plane of the MEMS switch.

In an exemplary embodiment, as shown in FIG. 9, the film bridge 8 may include: a middle region 80, and a first connection region 81 and a second connection region 82 arranged on two sides of the middle region 80 in the first direction DR1, the first connection region 81 is configured to be connected to the first wire 7, the second connection region 82 is configured to be connected to the third wire 9. The middle region 80 may include: a first sub-region 801, a second sub-region 802 and a third sub-region 803 connected sequentially, there is a first overlapping region between an orthographic projection of the first sub-region 801 on the substrate 1 and an orthographic projection of the first DC bias line 2 on the substrate 1, there is a second overlapping region between an orthographic projection of the second sub-region 802 on the substrate 1 and an orthographic projection of the second wire 4 on the substrate 1, there is a third overlapping region between an orthographic projection of the third sub-region 803 on the substrate 1 and the orthographic projection of the first DC bias line 2 on the substrate 1, and the first overlapping region, the second overlapping region and the third overlapping region are spaced along the first direction DR1.

For example, as shown in FIG. 9, the size of the first sub-region 801 in the second direction DR2, the size of the third sub-region 803 in the second direction DR2, the size of the first connection region 81 in the second direction DR2, the size of the second connection region 82 in the second direction DR2, and the size of the second sub-region 802 in the second direction DR2 are equal.

In an exemplary embodiment, as shown in FIG. 9, the film bridge 8 may also include: a first transition region 83 provided between the first connection region 81 and the middle region 80, and a second transition region 84 provided between the middle region 80 and the second connection region 82. An orthographic projection of the first transition region 83 on the substrate 1 is located between an orthographic projection of the first wire 7 on the substrate 1 and an orthographic projection of the first DC bias line 2 on the substrate 1, and an orthographic projection of the second transition region 84 on the substrate 1 is located between an orthographic projection of the second DC bias line 6 on the substrate 1 and an orthographic projection of the third wire 9 on the substrate 1.

In an exemplary embodiment, the first transition region 83 and the second transition region 84 are one or more of a region with an opening and a region without an opening. For example, as shown in FIG. 9, the first transition region 83 and the second transition region 84 may both be the region without an opening.

In an exemplary embodiment, the working principle of the MEMS switch shown in FIG. 9 may include: as shown in FIG. 11, when a DC bias voltage is applied to the first DC bias line 2 and the second DC bias line 6, by being subjected to an electrostatic force the film bridge 8 is moved towards the RF signal transmission line (i.e., the second wire 4), and changes from a flat straight state to a pull-down bending state. Since there is a third isolation layer 10 between the film bridge 8 and the RF signal transmission line (i.e., the second wire 4), a large capacitance may be formed, and the RF signal on the RF signal transmission line (i.e., the second wire 4) will be coupled to the first ground line (i.e., the first wire 7) and the second ground line (i.e., the third wire 9) on two sides, thereby achieving the control of the radio frequency signal and making the MEMS switch in an on state. As shown in FIG. 10, when a DC bias voltage is not applied to the first DC bias line 2 and the second DC bias line 6, the film bridge 8 moves in a direction away from the RF signal transmission line (i.e., the second wire 4), and changes from a pull-down bending state to a flat straight state, so that the MEMS switch is in an off state.

In an exemplary embodiment, the MEMS switch shown in FIG. 9 may be implemented as a capacitive RF MEMS switch. For example, the MEMS switch shown in FIG. 9 may be applied to high frequency bands, so that parasitic effects caused by metal contact can be effectively avoided for high frequency signal transmission systems.

Figure 12:
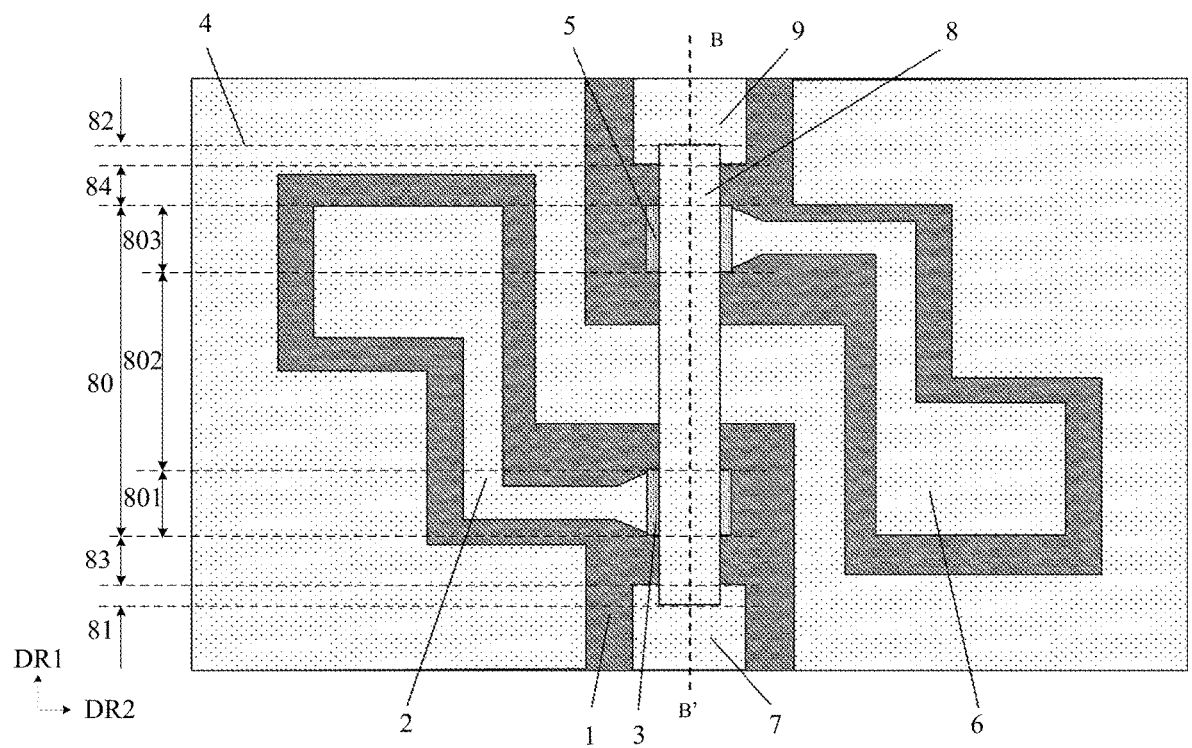
FIG. 12 is a schematic diagram of a sixth plane structure of a MEMS switch in an exemplary embodiment of the present disclosure.
Figure 13:
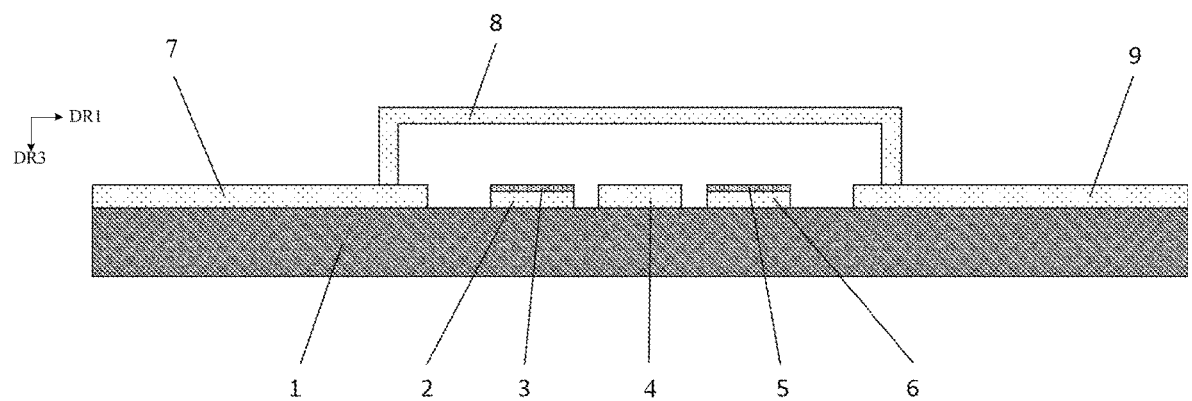
FIG. 13 is a schematic cross-sectional view of the MEMS switch shown in FIG. 12 in a voltage unapplied state along the BB' direction.
Figure 14:
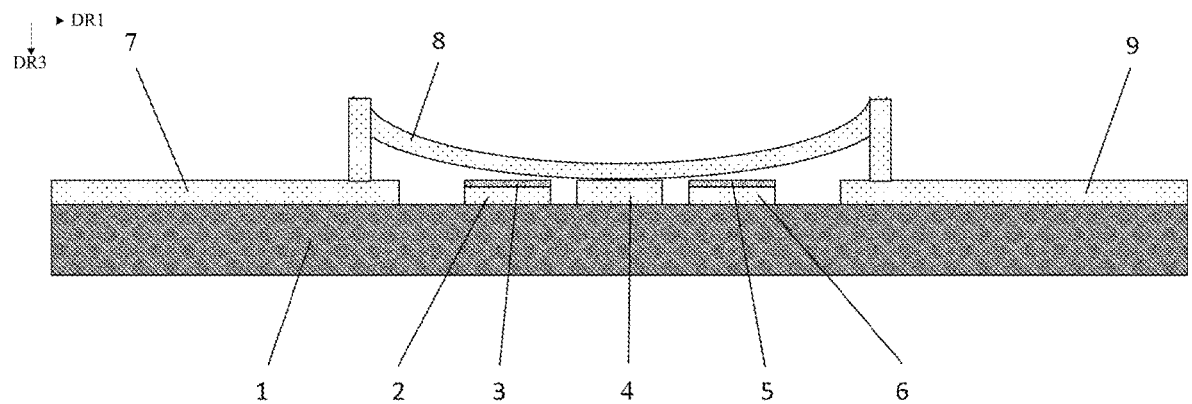
FIG. 14 is a schematic cross-sectional view of the MEMS switch shown in FIG. 12 in a voltage applied state along the BB' direction.

FIG. 12 is a schematic diagram of a sixth plane structure of a MEMS switch in an exemplary embodiment of the present disclosure. FIG. 13 is a schematic cross-sectional view of the MEMS switch shown in FIG. 12 in a voltage unapplied state along the BB' direction. FIG. 14 is a schematic cross-sectional view of the MEMS switch shown in FIG. 12 in a voltage applied state along the BB' direction. In FIG. 12 to FIG. 14, illustrations are made by taking a second wire used as a ground line, a first wire used as a first RF signal transmission line, and a third wire used as a second RF signal transmission line as an example.

In an exemplary embodiment, as shown in FIGS. 12 to 14, an embodiment of the present disclosure provides a MEMS switch. In a plane perpendicular to a substrate 1, the MEMS switch may include the substrate 1, a coplanar waveguide line structure disposed on a side of the substrate 1, an isolation structure disposed on a side of the coplanar waveguide line structure away from the substrate 1, and a film bridge 8 disposed on a side of the isolation structure away from the substrate 1. In a plane parallel to the substrate 1, the coplanar waveguide line structure may include: a first wire 7, a first DC bias line 2, a second wire 4, a second DC bias line 6 and a third wire 9, wherein the second wire 4 may be used as a ground line, the first wire 7 may serve as a first RF signal transmission line, the third wire 9 may serve as a second RF signal transmission line. At least part of the ground line is located at the center position, the first DC bias line 2 and the second DC bias line 6 are located on two sides of the ground line in the second direction DR1, the first RF signal transmission line is located on a side of the first DC bias line 2 away from the ground line, and the second RF signal transmission line is located on a side of the second DC bias line 6 away from the ground line. The isolation structure may include a first isolation layer 3 and a second isolation layer 5. In a plane perpendicular to the substrate 1, the first isolation layer 3 is disposed on a side of the first DC bias line 2 away from the substrate 1, and the second isolation layer 5 is disposed on a side of the second DC bias line 6 away from the substrate 1. The film bridge 8 is crossed and suspended over the first RF signal transmission line, the first isolation layer 3, the ground line, the second isolation layer 5 and the second RF signal transmission line in the first direction DR1, and one terminal of the film bridge 8 is connected with the first RF signal transmission line, and the other terminal of the film bridge 8 is connected with the second RF signal transmission line.

In this way, Compared with the design of the "ground line-signal wire-ground line" structure adopted by the coplanar waveguide structure in some technologies, in the MEMS switch provided in exemplary embodiments of the present disclosure, the coplanar waveguide structure adopts the design of the "signal line-bias line-ground line-bias line-signal line" structure, which can achieve the decoupling of the signal line and the DC bias line, and can ensure the normal drive operation of the MEMS switch and reduce the interference between the DC bias voltage and the radio frequency signal by placing an isolation layer on the DC bias lines at two sides, thereby improving the drive performance of the MEMS switch.

In an exemplary embodiment, as shown in FIG. 12, the first DC bias line 2 and the second DC bias line 6 each include: a first bias line segment, a second bias line segment, and a third bias line segment connected sequentially; the first bias line segment and the third bias line segment each extend in the second direction DR2, the second bias line segment extends in the first direction DR1, wherein the second direction DR2 intersects the first direction DR1.

In an exemplary embodiment, as shown in FIG. 12, the first DC bias line 2 and the second DC bias line 6 have the same shape.

In an exemplary embodiment, as shown in FIG. 12, the ground line (i.e. the second wire 4) is arranged symmetrically with respect to a center point, which may be the geometric center of the substrate 1.

In an exemplary embodiment, as shown in FIG. 12, the first DC bias line 2 and the second DC bias line 6 have the same shape. The first DC bias line 2 and the second DC bias line 6 are arranged symmetrically with respect to a center point, which may be the geometric center of the substrate 1.

In an exemplary embodiment, as shown in FIG. 12, a first RF signal transmission line (i.e. first wire 7) and a second RF signal transmission line (i.e. third wire 9) are arranged symmetrically with respect to a center point, which is the geometric center of the substrate 1.

In an exemplary embodiment, as shown in FIG. 12, shapes of the first RF signal transmission line (i.e., the first wire 7) and the second RF signal transmission line (i.e., the third wire 9) are rectangular in a plane parallel to the substrate 1.

In an exemplary embodiment, as shown in FIG. 12, when the second wire 4 is a ground line, the ground line may be shaped as a polyline shape.

In an exemplary embodiment, as shown in FIG. 12, the ground line (i.e., the second wire 4) may include a first ground line segment, a second ground line segment, and a third ground line segment connected sequentially, each of which has a stepped shape.

In an exemplary embodiment, as shown in FIG. 12, the first and third ground line segments are identical in shape and are symmetrically disposed about a center point, and the second ground line segment is symmetrically disposed about the center point, wherein the center point is the geometric center of the substrate 1.

In an exemplary embodiment, the shape of the film bridge 8 may be shaped as a shape of a character "H" or a character "-".

In an exemplary embodiment, as shown in FIG. 12, the film bridge 8 may include: a middle region 80, and a first connection region 81 and a second connection region 82 arranged on two sides of the middle region 80 in the first direction DR1, the first connection region 81 is configured to be connected to the first wire 7, and the second connection region 82 is configured to be connected to the third wire 9. The middle region 80 may include: a first sub-region 801, a second sub-region 802 and a third sub-region 803 connected sequentially, there is a first overlapping region between an orthographic projection of the first sub-region 801 on the substrate 1 and an orthographic projection of the first DC bias line 2 on the substrate 1, there is a second overlapping region between an orthographic projection of the second sub-region 802 on the substrate 1 and an orthographic projection of the second wire 4 on the substrate 1, there is a third overlapping region between an orthographic projection of the third sub-region 803 on the substrate 1 and the orthographic projection of the first DC bias line 2 on the substrate 1, and the first overlapping region, the second overlapping region and the third overlapping region are spaced along the first direction DR1.

For example, as shown in FIG. 12, a size of the first sub-region 801 in the second direction DR2, a size of the third sub-region 803 in the second direction DR2, a size of the first connection region 81 in the second direction DR2, a size of the second connection region 82 in the second direction DR2, and a size of the second sub-region 802 in the second direction DR2 are equal.

In an exemplary embodiment, as shown in FIG. 12, the film bridge 8 may also include: a first transition region 83 provided between the first connection region 81 and the middle region 80, and a second transition region 84 provided between the middle region 80 and the second connection region 82. An orthographic projection of the first transition region 83 on the substrate 1 is located between an orthographic projection of the first wire 7 on the substrate 1 and an orthographic projection of the first DC bias line 2 on the substrate 1, and an orthographic projection of the second transition region 84 on the substrate 1 is located between an orthographic projection of the second DC bias line 6 on the substrate 1 and an orthographic projection of the third wire 9 on the substrate 1.

In an exemplary embodiment, the first transition region 83 and the second transition region 84 are one or more of a region with an opening and a region without an opening. For example, as shown in FIG. 12, the first transition region 83 and the second transition region 84 may both be the region without an opening.

In an exemplary embodiment, the working principle of the MEMS switch shown in FIG. 12 may include: as shown in FIG. 14, when a DC bias voltage is applied to the first DC bias line 2 and the second DC bias line 6, by being subjected to an electrostatic force the film bridge 8 is moved towards the ground line (i.e., the second wire 4), and changes from a flat straight state to a pull-down bending state. Since there is no isolation layer between the film bridge 8 and the ground line (i.e., the second wire 4), after being bent, the film bridge 8 may be contacted with the ground line (i.e., the second wire 4), so that the film bridge 8, the first RF signal transmission line (i.e., the first wire 7) and the second RF signal transmission line (i.e., the third wire 9) together form a signal transmission line, which is connected in parallel to the ground line (i.e., the second wire 4), so that the MEMS switch is in an on state. As shown in FIG. 13, when a DC bias voltage is not applied to the first DC bias line 2 and the second DC bias line 6, the film bridge 8 moves in a direction away from the ground line (i.e., the second wire 4), and changes from the pull-down bending state to the flat straight state, so that the MEMS switch is in an off state.

In an exemplary embodiment, the MEMS switch shown in FIG. 12 may be implemented as a direct access MEMS parallel switch.

An embodiment of the present disclosure further provides a method for preparing a MEMS switch, which is suitable for preparing a MEMS switch in one or more of the above embodiments.

Figure 15:
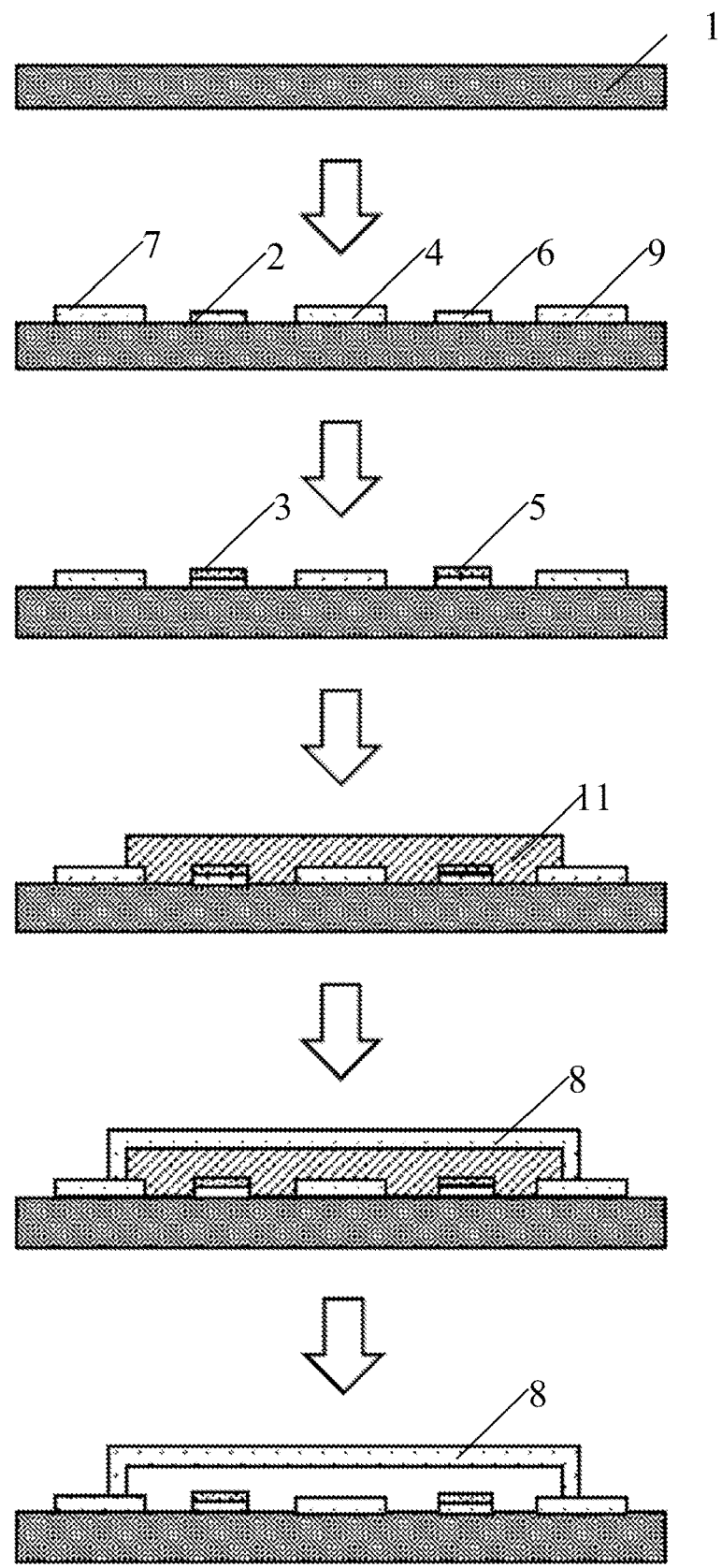
FIG. 15 is a schematic diagram of a preparation process of the MEMS switch shown in FIG. 1.

FIG. 15 is a schematic diagram of a preparation process of the MEMS switch shown in FIG. 1. With reference to the structure of the MEMS switch shown in FIG. 1, a method for preparing the MEMS switch in the exemplary embodiment of the present disclosure will be described in conjunction with the accompanying drawings.

In an exemplary embodiment, as shown in FIG. 15, the method may include the following acts.

In act S1, a coplanar waveguide line structure and an isolation structure are sequentially formed on the substrate 1. The coplanar waveguide line structure includes a first wire 7, a first DC bias line 2, a second wire 4, a second DC bias line 6 and a third wire 9 arranged at intervals sequentially, and the isolation structure includes a first isolation layer 3 arranged on a side of the first DC bias line 2 away from the substrate 1, and a second isolation layer 5 arranged on a side of the second DC bias line 6 away from the substrate 1. The second wire 4 is one of an RF signal transmission line and a ground line, and the first wire 7 and the third wire 9 are both the other one of an RF signal transmission line and a ground line.

In act S2, a sacrifice layer 11 is formed on the coplanar waveguide line structure and the isolation structure.

In act S3, a film bridge 8 is formed on the sacrifice layer 11, the film bridge 8 is crossed between the first wire 7 and the third wire 9 and is connected with the first wire 7 and the third wire 9 respectively.

In act S4, the sacrifice layer 11 is removed, and the film bridge 8 is retained.

Thus, the MEMS switch prepared by the preparation method provided by the embodiment of the present disclosure can improve the yield and the service life of the switch. Moreover, the preparation process of MEMS switch can be simplified by using sacrifice layer for planarization in the process.

In an exemplary embodiment, the film bridge 8 is not water-soluble, and the sacrifice layer 11 is water-soluble; alternatively the film bridge 8 does not have degradability, and the sacrifice layer 11 has degradability. Therefore, the preparation process of MEMS switch can be simplified.

In an exemplary embodiment, the film bridge 8 may be made of metal material, such as any one or more of silver (Ag), copper (Cu), aluminum (Al), titanium (Ti) and molybdenum (Mo), or alloy of the above metals, such as aluminum neodymium alloy (AlNd) or molybdenum niobium alloy (MoNb), and may have a single-layered structure or a multi-layered composite structure, such as Ti/Al/Ti.

In an exemplary embodiment, taking a case where the sacrifice layer 11 is water-soluble as an example, the material of the sacrifice layer 11 may include a water-soluble material. For example, the water-soluble material may include at least one of a polyvinyl alcohol resin and a polycaprolactone resin. Here, the embodiments of the present disclosure are not limited to this.

In an exemplary embodiment, taking the sacrifice layer 11 having degradability as an example, the material of the sacrifice layer 11 may include a degradable material. For example, the degradable material may include a degradable imprint adhesive. For example, the degradable imprint adhesive may include a degradable resin. Here, the embodiments of the present disclosure are not limited to this.

In an exemplary embodiment, act S4 may include act S41: the sacrifice layer 11 is removed using a specific film removal process, and the film bridge 8 is retained.

In an exemplary embodiment, taking a case where the material of the sacrifice layer 11 is a degradable material as an example, the act S41 may include degrading the sacrifice layer 11 by a degradation process to achieve the removal of the sacrifice layer 11 and retention of the film bridge 8. For example, the degradable material includes a degradable imprint adhesive which includes a ketal or acetal group. After the degradable imprint adhesive is cured, the ketal or acetal functional group of a crosslinking group us unstable under a weakly acidic condition. For example, the substrate for preparing the above structure may be placed in a weak acidic environment (for example, immersed in a weak acid solution), and the crosslinking group is hydrolyzed under the weak acidic condition, and the crosslinking bond is broken, so that the insoluble net structure is changed into a soluble linear structure, thus achieving the purpose of degradation.

In an exemplary embodiment, taking a case where the material of the sacrifice layer 11 is a water-soluble material as an example, act S41 may include dissolving the sacrifice layer 11 by an aqueous solvent to achieve the removal of the sacrifice layer 11 and retention of the film bridge 8.

In an exemplary embodiment, after the sacrifice layer 11 is degraded by a degradation process or dissolved by an aqueous solvent in act S41, a portion of water is left on the surface of a structure such as the film bridge 8 or the substrate 1. In order to avoid the influence of the remaining water on the subsequent process, after the sacrifice layer 11 is removed by performing the act S41, the preparation method may further include drying a surface of the structure such as the film bridge 8 or the substrate 1. For example, the surface of the structure such as the film bridge 8 or the substrate 1 is purged with nitrogen gas. Here, the embodiments of the present disclosure are not limited to this.

In an exemplary embodiment, the substrate 1 may be a flexible substrate, or may be a rigid substrate. For example, the rigid substrate may include a glass or a silicon substrate or the like. For example, the flexible substrate may include, but is not limited to, Liquid Crystal Polymer (LCP), Polyimide (PI), Cyclo Olefin Polymer (COP), or polyethylene terephthalate (PET), etc. Here, the embodiments of the present disclosure are not limited to this.

In an exemplary embodiment, the material of the coplanar waveguide structure (for example, a first wire 7, a first DC bias line 2, a second wire 4, a second DC bias line 6 or a third wire 9) may be a metal material, e.g., any one or more of Argentum (Ag), Copper (Cu), Aluminum (Al), Titanium (Ti), and Molybdenum (Mo), or an alloy material of the abovementioned metals, e.g., an Aluminum-Neodymium alloy (AlNd) or a Molybdenum-Niobium alloy (MoNb), and the coplanar waveguide structure may be a single-layer structure, or a multilayer composite structure such as Ti/Al/Ti. Here, the embodiments of the present disclosure are not limited to this.

In an exemplary embodiment, the material of the isolation structure (for example, the first isolation layer 3 or the second isolation layer 5, etc.) may be any one or more of silicon oxide (SiOx), silicon nitride (SiNx), silicon oxynitride (SiON), and the isolation structure may be a single-layer structure or a multi-layer structure. Here, the embodiments of the present disclosure are not limited to this.

The description of the embodiments of the above preparation method is similar to that of the MEMS switch embodiment, and has similar advantages as the MEMS switch embodiment. Technical details undisclosed in the embodiments of the preparation method of the present embodiment are understood by those skilled in the art with reference to the description in the embodiments of the MEMS switch of the present disclosure, which will not be repeated here.

An embodiment of the present disclosure further provides an electronic apparatus. The electronic apparatus may include a MEMS switch in one or more of the above-described exemplary embodiments.

In an exemplary embodiment, the MEMS switch may be an RF MEMS switch. For example, the RF MEMS switch may be a film bridge RF MEMS switch. For example, the RF MEMS switch may be a contact RF MEMS switch or a capacitive RF MEMS switch. For example, the RF MEMS switch may be a direct access MEMS parallel switch.

In an exemplary embodiment, an electronic apparatus may include but is not limited to any product or component with a display function such as a mobile phone, a tablet computer, a television, a display, a notebook computer, a digital photo frame, or a navigator, etc. Here, no limitation is made thereto in the embodiments of the present disclosure.

The description of the embodiments of the above electronic apparatus is similar to that of the embodiments of the MEMS switch, and the embodiments of the above electronic apparatus have similar advantages as the embodiments of the MEMS switch. Technical details undisclosed in the embodiments of the electronic apparatus of the present disclosure may be understood by those skilled in the art with reference to the description in the embodiments of the MEMS switch of the present disclosure, which will not be repeated here.

Although the implementations of the present disclosure are disclosed above, the above contents are only implementations for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A Micro-Electro-Mechanical System (MEMS) switch, comprising: a substrate, a coplanar waveguide line structure disposed on a side of the substrate, an isolation structure disposed on a side of the coplanar waveguide line structure away from the substrate, and a film bridge disposed on a side of the isolation structure away from the substrate; wherein the coplanar waveguide line structure comprises a first wire, a first Direct Current (DC) bias line, a second wire, a second DC bias line and a third wire that are arranged at intervals sequentially; the second wire is one of a Radio Frequency (RF) signal transmission line and a ground line, and the first wire and the third wire are the other one of the RF signal transmission line and the ground line;

the film bridge is crossed between the first wire and the third wire, and is connected with the first wire and the third wire, respectively;

wherein the isolation structure comprises a first isolation layer disposed on a side of the first DC bias line away from the substrate, and a second isolation layer disposed on a side of the second DC bias line away from the substrate;

wherein the film bridge comprises: a middle region, and a first connection region and a second connection region arranged on two sides of the middle region in the first direction, the first connection region is configured to be connected with the first wire, the second connection region is configured to be connected with the third wire, the middle region comprises: a first sub-region, a second sub-region and a third sub-region connected sequentially, there is a first overlapping region between an orthographic projection of the first sub-region on the substrate and an orthographic projection of the first DC bias line on the substrate, there is a second overlapping region between an orthographic projection of the second sub-region on the substrate and an orthographic projection of the second wire on the substrate, there is a third overlapping region between an orthographic projection of the third sub-region on the substrate and the orthographic projection of the first DC bias line on the substrate, and the first overlapping region, the second overlapping region and the third overlapping region are spaced along the first direction.

2. The MEMS switch according to claim 1, wherein the first DC bias line and the second DC bias line each comprise: a first bias line segment, a second bias line segment, and a third bias line segment connected sequentially; the first bias line segment and the third bias line segment each extend in a second direction, the second bias line segment extends in a first direction, wherein the second direction intersects the first direction.

3. The MEMS switch according to claim 1, wherein in a direction perpendicular to a plane of the MEMS switch, a thickness of the second wire is greater than or equal to a thickness of the first isolation layer, and the thickness of the second wire is greater than or equal to a thickness of the second isolation layer;

or in a direction perpendicular to a plane of the MEMS switch, a thickness of the second wire is greater than or equal to a sum of a thickness of the first DC bias line and a thickness of the first isolation layer, and the thickness of the second wire is greater than or equal to a sum of a thickness of the second DC bias line and a thickness of the second isolation layer.

4. The MEMS switch according to claim 1, wherein when the second wire is an RF signal transmission line, the substrate has a center line extending in a second direction, the second wire is symmetrically disposed about the center line, the first and second DC bias lines are symmetrically disposed about the center line, and the first and third wires are symmetrically disposed about the center line;

or when the second wire is a ground line, the second wire is symmetrically disposed about a center point, the first and second DC bias lines are symmetrically disposed about the center point, and the first and third wires are symmetrically disposed about the center point, wherein the center point is a geometric center of the substrate.

5. The MEMS switch according to claim 1, wherein an orthographic projection of the first isolation layer on the substrate is located within a spacing region between an orthographic projection of the first wire on the substrate and an orthographic projection of the second wire on the substrate, and an orthographic projection of the second isolation layer on the substrate is located within a spacing region between the orthographic projection of the second wire on the substrate and an orthographic projection of the third wire on the substrate.

6. The MEMS switch according to claim 1, wherein the film bridge extends in a first direction, a size of the first isolation layer in a second direction and a size of the second isolation layer in the second direction are both greater than a size of the film bridge in the second direction, wherein the second direction intersects the first direction.

7. The MEMS switch according to claim 1, wherein when the second wire is an RF signal transmission line, the isolation structure further comprises: a third isolation layer that is disposed on a surface of the RF signal transmission line away from the substrate; or, disposed on a surface of the film bridge close to the substrate.

8. The MEMS switch according to claim 7, wherein when the third isolation layer is disposed on the surface of the RF signal transmission line away from the substrate, the third isolation layer, the first isolation layer, and the second isolation layer are an integrated structure connecting to each other; or, when the third isolation layer is disposed on the surface of the film bridge close to the substrate, the first isolation layer, the third isolation layer, and the second isolation layer are spaced in a first direction;

or the film bridge extends in the first direction, and a size of the third isolation layer in the first direction greater than or equal to a size of the RF signal transmission line in the first direction; or, a size of the third isolation layer in the second direction is smaller than a size of the RF signal transmission line in the second direction, and the second direction intersects the first direction; or, a thickness of the third isolation layer is less than or equal to a thickness of the RF signal transmission line in a direction perpendicular to a plane of the MEMS switch.

9. The MEMS switch according to claim 1, wherein in a plane parallel to the MEMS switch, when the second wire is an RF signal transmission line, a shape of the RF signal transmission line is a long strip shape; or, when the second wire is a ground line, the ground line is shaped as a polyline shape.

10. The MEMS switch according to claim 9, wherein the ground line comprises a first ground line segment, a second ground line segment, and a third ground line segment connected sequentially, the first ground line segment, the second ground line segment, and the third ground line segment each have a stepped shape.

11. The MEMS switch according to claim 1, wherein at least one of the first sub-region, the third sub-region, the first connection region and the second connection region has a size in a second direction equal to a size of the second sub-region in the second direction; or, at least one of the first sub-region and the third sub-region has a size in a second direction larger than a size of at least one of the second sub-region, the first connection region and the second connection region in the second direction, wherein the second direction intersects the first direction.

12. The MEMS switch according to claim 11, wherein a size of the first sub-region in the second direction is equal to a size of the third sub-region in the second direction; or, a size of the first connection region in the second direction is equal to a size of the second connection region in the second direction.

13. The MEMS switch according to claim 1, wherein in a plane parallel to the MEMS switch, the middle region is shaped as a shape of a character "H" or a character "-"; or, shapes of the first connection region and the second connection region are rectangular;

or the orthographic projection of the first sub-region on the substrate is within a boundary range of an orthographic projection of the first isolation layer on the substrate, and the orthographic projection of the third sub-region on the substrate is within a boundary range of an orthographic projection of the second isolation layer on the substrate;

or the film bridge further comprises: a first transition region disposed between the first connection region and the middle region, and a second transition region disposed between the middle region and the second connection region, an orthographic projection of the first transition region on the substrate is located between an orthographic projection of the first wire on the substrate and the orthographic projection of the first DC bias line on the substrate, and an orthographic projection of the second transition region on the substrate is located between an orthographic projection of the second DC bias line on the substrate and an orthographic projection of the third wire on the substrate.

14. The MEMS switch according to claim 13, wherein the first transition region and the second transition region are one or more of a region with an opening and a region without an opening;

or
at least one of the first transition region and the second transition region has a size in a second direction equal to a size of the second sub-region in the second direction; or, at least one of the first transition region and the second transition region has a size in the second direction greater than a size of the second sub-region in the second direction, wherein the second direction intersects the first direction.

15. The MEMS switch according to claim 14, wherein the region with an opening comprises: at least one of a first groove provided on a first edge of the region with an opening, a second groove provided on a second edge of the region with an opening, and a through hole provided between the first edge and the second edge, the first edge and the second edge extend along the first direction and are disposed opposite to each other along a second direction, wherein the second direction intersects the first direction.

16. The MEMS switch according to claim 15, wherein a size of the through hole in the second direction is less than or equal to 0.75 times a distance between the first edge and the second edge; or, in a plane parallel to the MEMS switch, an area of the through hole is less than or equal to 0.6 times an area of a transition region where the through hole is located, and the transition region is any one of the first transition region and the second transition region;
or
a size of a groove in the second direction is less than or equal to 0.75 times a distance between the first edge and the second edge; or, in a plane parallel to the MEMS switch, an area of the groove is less than or equal to 0.6 times an area of a transition region where the through hole is located; or, in two adjacent grooves in a same transition region, a size of any one of the two grooves in the first direction is equal to a size of a spacing region between the two grooves in the first direction, the groove comprises at least one of the first groove and the second groove, and the transition region comprises any one of the first transition region and the second transition region;
or
in a plane parallel to the MEMS switch, a shape of the through hole is any one of a circle, an ellipse, a triangle, a rectangle, a diamond, a trapezoid, a pentagon, and a hexagon; or, a shape of at least one of the first groove and the second groove is any one of an arc, a triangle, a rectangle, a trapezoid, a pentagon and a hexagon.

17. An electronic apparatus, comprising the MEMS switch according to claim 1.

18. A method for preparing a Micro-Electro-Mechanical System (MEMS) switch, comprising:
sequentially forming a coplanar waveguide line structure and an isolation structure on a substrate, wherein the coplanar waveguide line structure comprises a first wire, a first Direct Current (DC) bias line, a second wire, a second DC bias line and a third wire arranged at intervals sequentially; the second wire is one of a Radio Frequency (RF) signal transmission line and a ground line, and the first wire and the third wire are the other one of the RF signal transmission line and the ground line;
forming a sacrifice layer on the coplanar waveguide line structure and the isolation structure;
forming a film bridge on the sacrifice layer, wherein the film bridge is crossed between the first wire and the third wire, and is connected with the first wire and the third wire, respectively; and
removing the sacrifice layer and retaining the film bridge;
wherein the isolation structure comprises a first isolation layer disposed on a side of the first DC bias line away from the substrate, and a second isolation layer disposed on a side of the second DC bias line away from the substrate;
wherein the film bridge comprises: a middle region, and a first connection region and a second connection region arranged on two sides of the middle region in the first direction, the first connection region is configured to be connected with the first wire, the second connection region is configured to be connected with the third wire, the middle region comprises: a first sub-region, a second sub-region and a third sub-region connected sequentially, there is a first overlapping region between an orthographic projection of the first sub-region on the substrate and an orthographic projection of the first DC bias line on the substrate, there is a second overlapping region between an orthographic projection of the second sub-region on the substrate and an orthographic projection of the second wire on the substrate, there is a third overlapping region between an orthographic projection of the third sub-region on the substrate and the orthographic projection of the first DC bias line on the substrate, and the first overlapping region, the second overlapping region and the third overlapping region are spaced along the first direction.

* * * * *